United States Patent
Pinn et al.

(10) Patent No.: US 9,338,525 B2
(45) Date of Patent: *May 10, 2016

(54) METHODS OF AUTOMATICALLY RECORDING PATCHING CHANGES AT PASSIVE PATCH PANELS AND NETWORK EQUIPMENT

(71) Applicant: CommScope, Inc. of North Carolina, Hickory, NC (US)

(72) Inventors: Gregory Pinn, Dallas, TX (US); Chin Choi-Feng, Carrollton, TX (US); G Mabud Choudhury, Warren, NJ (US); Michael G. German, Secaucus, NJ (US); Matias Peluffo, Guadalajara (ES); George Brooks, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,946

(22) Filed: Jul. 29, 2015

(65) Prior Publication Data

US 2015/0334473 A1 Nov. 19, 2015

Related U.S. Application Data

(63) Continuation of application No. 14/138,463, filed on Dec. 23, 2013, now Pat. No. 9,123,217, which is a continuation-in-part of application No. 12/826,118, filed on Jun. 29, 2010, now Pat. No. 8,643,476.

(60) Provisional application No. 61/221,306, filed on Jun. 29, 2009.

(51) Int. Cl.
*G08B 3/00* (2006.01)
*H04Q 1/24* (2006.01)
(Continued)

(52) U.S. Cl.
CPC .. *H04Q 1/24* (2013.01); *G06K 9/20* (2013.01); *G06K 9/64* (2013.01); *G06K 9/78* (2013.01); *G08B 5/22* (2013.01); *H04Q 1/09* (2013.01); *H04Q 1/136* (2013.01)

(58) Field of Classification Search
CPC ............ G06K 7/10366; G06K 7/0008; G06K 19/0723; G06K 7/10009; G08B 21/18; G08B 13/1409; G08B 21/24; G08B 13/1427; H01L 2924/00; H01L 2224/48227; H01L 2224/48247; H02B 1/04; H02B 1/056; H02B 1/015
USPC ............. 340/10.1–10.6, 691.6; 439/491, 489; 361/600, 627, 636, 633
See application file for complete search history.

(56) References Cited

U.S. PATENT DOCUMENTS 5,483,467 A 1/1996 Krupka et al.
5,721,672 A 2/1998 Costa et al.
(Continued)

FOREIGN PATENT DOCUMENTS

EP 1 796 403 A2 6/2007
GB 2 347 507 A 9/2000
(Continued)

OTHER PUBLICATIONS

Actassi—Technical Catalogue, 10 pages; http://www.schneider-electric.ae/documents/clipsal/PDF/SE_VDI_Technical_Catalogue_Actassi.pdf.
(Continued)

*Primary Examiner* — George Bugg
*Assistant Examiner* — Sharmin Akhter
(74) *Attorney, Agent, or Firm* — Myers Bigel & Sibley, P.A.

(57) ABSTRACT

Methods of executing patching connection changes in a patching field are provided in which an electronic work order is received on a display located at the patching field, the electronic work order specifying the patching connection change. A technician may perform the patching connection change. Then, an electronic message may be sent from the patching field indicating that the patching change has been completed.

19 Claims, 12 Drawing Sheets

(51) Int. Cl.
  *G08B 5/22* (2006.01)
  *G06K 9/64* (2006.01)
  *G06K 9/78* (2006.01)
  *G06K 9/20* (2006.01)
  *H04Q 1/02* (2006.01)

(56) References Cited

U.S. PATENT DOCUMENTS

| | | |
|---|---|---|
| 6,002,331 A | 12/1999 | Laor |
| 6,222,908 B1 | 4/2001 | Bartolutti et al. |
| 6,285,293 B1 | 9/2001 | German et al. |
| 6,330,307 B1 | 12/2001 | Bloch et al. |
| 6,350,148 B1 | 2/2002 | Bartolutti et al. |
| 6,424,710 B1 | 7/2002 | Bartolutti et al. |
| 6,784,802 B1 | 8/2004 | Stanescu |
| 7,170,393 B2 | 1/2007 | Martin |
| 7,176,898 B2 | 2/2007 | Litwiller |
| 7,193,422 B2 | 3/2007 | Velleca et al. |
| 7,374,101 B2 | 5/2008 | Kaneko |
| 7,605,707 B2 | 10/2009 | German et al. |
| 7,934,022 B2 | 4/2011 | Velleca et al. |
| 8,248,208 B2 | 8/2012 | Renfro, Jr. |
| 8,618,912 B2 | 12/2013 | Khozyainov |
| 2006/0049942 A1 | 3/2006 | Sakama et al. |
| 2006/0110977 A1 | 5/2006 | Matthews |
| 2006/0148279 A1 | 7/2006 | German et al. |
| 2006/0244677 A1 | 11/2006 | Dempski |
| 2008/0122579 A1 | 5/2008 | German et al. |
| 2010/0109892 A1 | 5/2010 | Fariello et al. |
| 2010/0120264 A1 | 5/2010 | Caveney et al. |
| 2010/0210135 A1 | 8/2010 | German et al. |
| 2013/0223684 A1 | 8/2013 | Townend et al. |

FOREIGN PATENT DOCUMENTS

| | | |
|---|---|---|
| GB | 2 347 751 A | 9/2000 |
| JP | 07094242 | 4/1995 |
| JP | 2005/235615 | 9/2005 |
| WO | WO 99/26426 | 5/1999 |
| WO | WO 2006/063023 A1 | 6/2006 |
| WO | WO 2009/052381 A2 | 4/2009 |

OTHER PUBLICATIONS

Notification of Transmittal of the International Search Report and the Written Opinion of the International Searching Authority, or the Declaration; International Search Report; Written Opinion of the International Searching Authority; Corresponding International Application No. PCT/US2010/040329; Mailing date: Oct. 4, 2010; 14 pages.

Notification of Transmittal of the International Search Report and the Written Opinion of the International Searching Authority, or the Declaration; International Search Report; Written Opinion of the International Searching Authority; Corresponding International Application No. PCT/US2005/044202; Mailing date: May 3, 2006; 10 pages.

Notification of Transmittal of the International Search Report and the Written Opinion of the International Searching Authority, or the Declaration; International Search Report; Written Opinion of the International Searching Authority; Corresponding International Application No. PCT/US2009/063337; Mailing date: Mar. 29, 2010; 10 pages.

Notification of Transmittal of the International Search Report and the Written Opinion of the International Searching Authority, or the Declaration; International Search Report; Written Opinion of the International Searching Authority; Corresponding International Application No. PCT/US2010/024567; Mailing date: Jul. 1, 2010; 12 pages.

Notification of Transmittal of the International Search Report and the Written Opinion of the International Searching Authority, or the Declaration; International Search Report; Written Opinion of the International Searching Authority; Corresponding International Application No. PCT/US2007/024382; Mailing date: May 28, 2008; 10 pages.

International Preliminary Report for PCT/US2010/040329 mailed Sep. 22, 2011.

Internet Article titled Sixthsense—a wearable gestural interface (MIT Media Lab) dated Nov. 13, 2013, 5 pages, http://www.pranavmistry.com/projects/sixthsense/ (Admitted Prior Art).

Internet Article on Wikipedia titled Google Glass, http://en.wikipedia.orq/wiki/Google_Glass, dated Dec. 23, 2013, 7 pages (Admitted Prior Art).

First Office Action; corresponding to Chinese Application No. 201080038613.4; mailing date: Mar. 10, 2014; 13 pages.

METHODS OF AUTOMATICALLY RECORDING PATCHING CHANGES AT PASSIVE PATCH PANELS AND NETWORK EQUIPMENT

RELATED APPLICATIONS

This application claims priority under 35 U.S.C. §120 from U.S. patent application Ser. No. 14/138,463, filed Dec. 23, 2013, which in turn claims priority from U.S. patent application Ser. No. 12/826,118, filed Jun. 29, 2010, which in turn claims priority from U.S. Provisional Patent Application No. 61/221,306, filed Jun. 29, 2009, the disclosure of each of which is hereby incorporated herein by reference in its entirety.

FIELD OF THE INVENTION

The present invention relates generally to communications patching systems and, more particularly, to patch panels for communications patching systems.

BACKGROUND

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers may also terminate within a telecommunications closet.

A patching system is typically used to interconnect the various telecommunication lines within a telecommunications closet. In a telecommunications patching system, all of the telecommunication lines are terminated within a telecommunications closet in an organized manner. The organized terminations of the various lines are provided via the structure of the telecommunications closet. A mounting frame having one or more racks is typically located in a telecommunications closet. The telecommunications lines terminate on the racks, as is explained below. It is noted that the patching systems described herein may be used in connection with data center environments, providing interconnection between servers, switches, storage devices, and other data center equipment, as well as office/LAN environments.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain a plurality of optical communication connector ports (e.g., SC, ST, LC ports, etc.) 16. Each of the different communication connector ports 16 is hard wired to one of the communication lines. Accordingly, each communication line is terminated on a patch panel 12 in an organized manner. In small patch systems, all communication lines may terminate on the patch panels of the same rack. In larger patch systems, multiple racks may be used, wherein different communication lines terminate on different racks.

In FIG. 1, interconnections between the various communication lines are made using patch cords 20. Both ends of each patch cord 20 are terminated with connectors 22. One end of a patch cord 20 is connected to a connector port 16 of a first communication line and the opposite end of the patch cord 20 is connected to a connector port 16 of a second communications line. By selectively connecting the various lines with patch cords 20, any combination of communication lines can be interconnected.

In office/LAN environments, as employees move, change positions, and/or add and subtract lines, the patch cords in a typical telecommunications closet may be rearranged quite often. In data center environments, patching information requires updates based on provisioning/addition/subtraction of servers, switches, storage devices, and other data center equipment. Therefore, it is important to maintain a log or tracing system which provides port identification information, patch cord connection information and/or patch cord identification information. This information may be recorded and updated on handwritten or preprinted labels adjacent to the connector ports. Handwritten or preprinted patch cord labels (i.e., labels affixed or clipped to patch cords) may also provide connectivity information by providing a unique identifier for each patch cord. The overall interconnections of the various patch cords in a telecommunications closet may be monitored by manually updating a paper or computer based log.

These solutions suffer from numerous drawbacks. Handwritten or preprinted labels offer limited space for documenting connectivity information and are subject to error if and when they are updated. Also, handwritten or preprinted labels may obscure each other, especially in high density installations, and may be difficult to read in dark environments, such as telecommunications closets. Furthermore, handwritten or preprinted labels do not provide an automated log or tracing system for the patch cords. Where a paper or computer based log is employed, technicians may neglect to update the log each and every time a change is made. These manually updated logs are also prone to erroneous entries.

Therefore, regardless of the procedure used, the log or tracing system inevitably becomes less than 100% accurate and a technician has no way of reading where each of the patch cords begins and ends. Accordingly, each time a technician needs to change a patch cord, the technician manually traces that patch cord between two connector ports. To perform a manual trace, the technician locates one end of a patch cord and then manually follows the patch cord until he/she finds the opposite end of that patch cord. Once the two ends of the patch cord are located, the patch cord can be positively identified.

It may take a significant amount of time for a technician to manually trace a particular patch cord, particularly within a collection of other patch cords. Furthermore, manual tracing may not be completely accurate and technicians may accidentally go from one patch cord to another during a manual trace. Such errors may result in misconnected telecommunication lines which must be later identified and corrected. Also, it may be difficult to identify the correct port to which a particular patch cord end should be connected or disconnected. Thus, ensuring that the proper connections are made can be very time-consuming, and the process is prone to errors in both the making of connections and in keeping records of the connections. Accordingly, a need exists for accurately and quickly tracing, detecting and identifying the ends of patch cords in a telecommunications closet. A need also exists for accurately and quickly knowing which ports are connected by patch cords.

SUMMARY

Pursuant to embodiments of the present invention, methods of executing a patching connection change in a patching field are provided. Pursuant to these methods, an electronic work order is received at a display located at the patching field. This electronic work order may specify the patching connection change that is to be performed. A technician may read the electronic work order and execute the patching connection change. An electronic message may be sent from the patching field indicating that the patching change has been completed.

The patching connection change may involve adding, changing or deleting a patching connection at a passive patch panel. In some embodiments, the display may be a display that is retrofitted onto the passive patch panel. In other embodiments, the display may be a display that is associated with a rack controller. In order to send the electronic message from the patching field that indicates that the patching change has been completed, the technician may activate an input mechanism that is associated with the display. In response to the activation of this input mechanism, the electronic message may be sent to a system controller. The input mechanism may comprise, for example, a push button or a touch screen capability of the display.

In some embodiments, the performance of the patching connection may involve performing a first operation of the patching connection change, and then sending a first message indicating that the first operation has been completed; and then performing a second operation of the patching connection change, and then sending a second message indicating that the second operation has been completed. The patching connection change may be the addition of a patch cord to form a new patching connection. In such embodiments, the first operation may be plugging a first end of the patch cord into a first connector port and the second operation may be plugging a second end of the patch cord into a second connector port. Alternatively, the patching connection change may be changing an existing patching connection. In such embodiments, the first operation may be unplugging a first end of a patch cord from a first connector port and the second operation may be plugging the first end of the patch cord into a second connector port. A connectivity database may be updated to reflect that the patching connection change has been completed in response to the second message.

It is noted that any one or more aspects or features described with respect to one embodiment may be incorporated in a different embodiment although not specifically described relative thereto. That is, all embodiments and/or features of an embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

Figure 1:
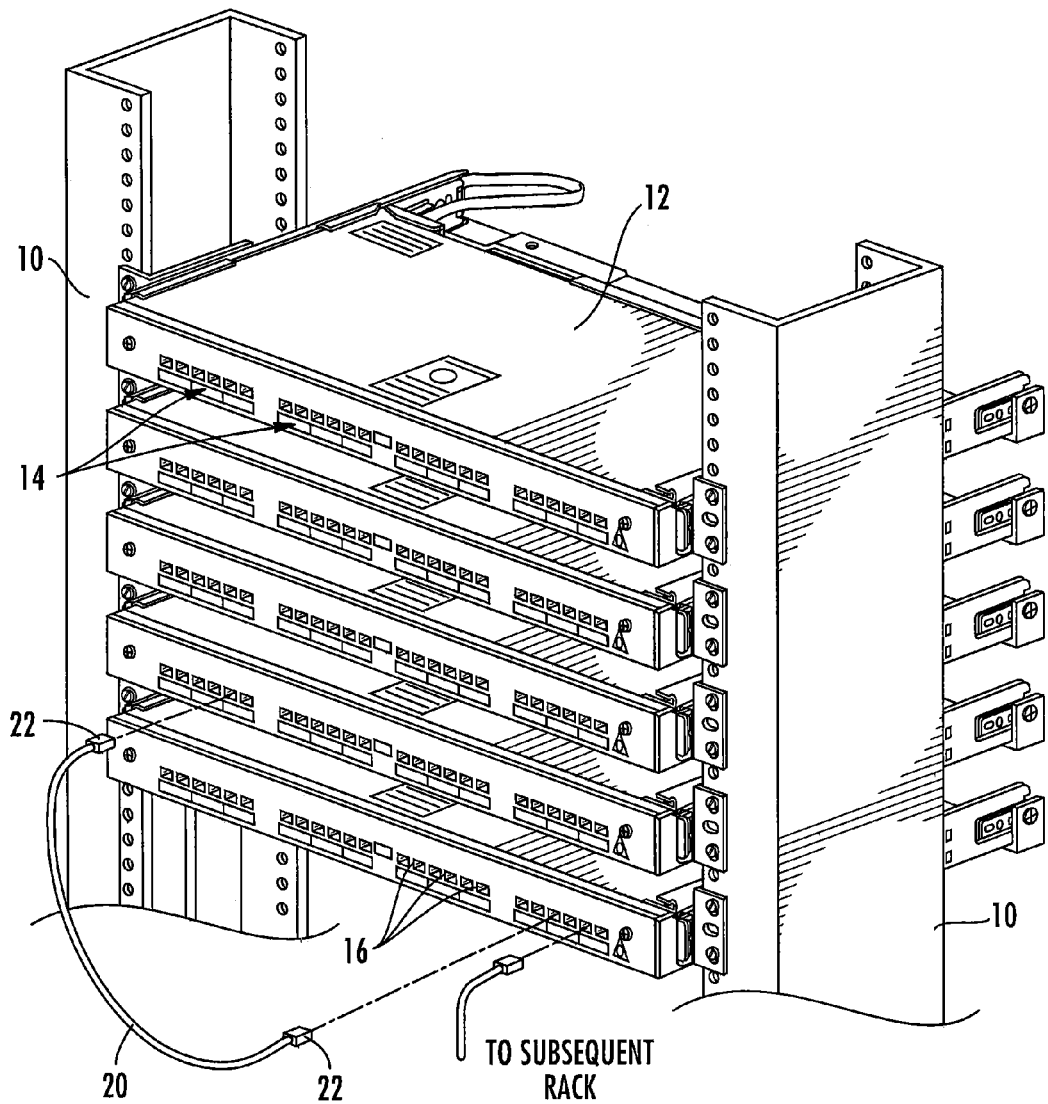
FIG. 1 is a perspective view of a typical prior art communication rack assembly containing multiple patch panels with connector ports that are selectively interconnected by patch cords.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

In the drawings, the thickness of lines and elements may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
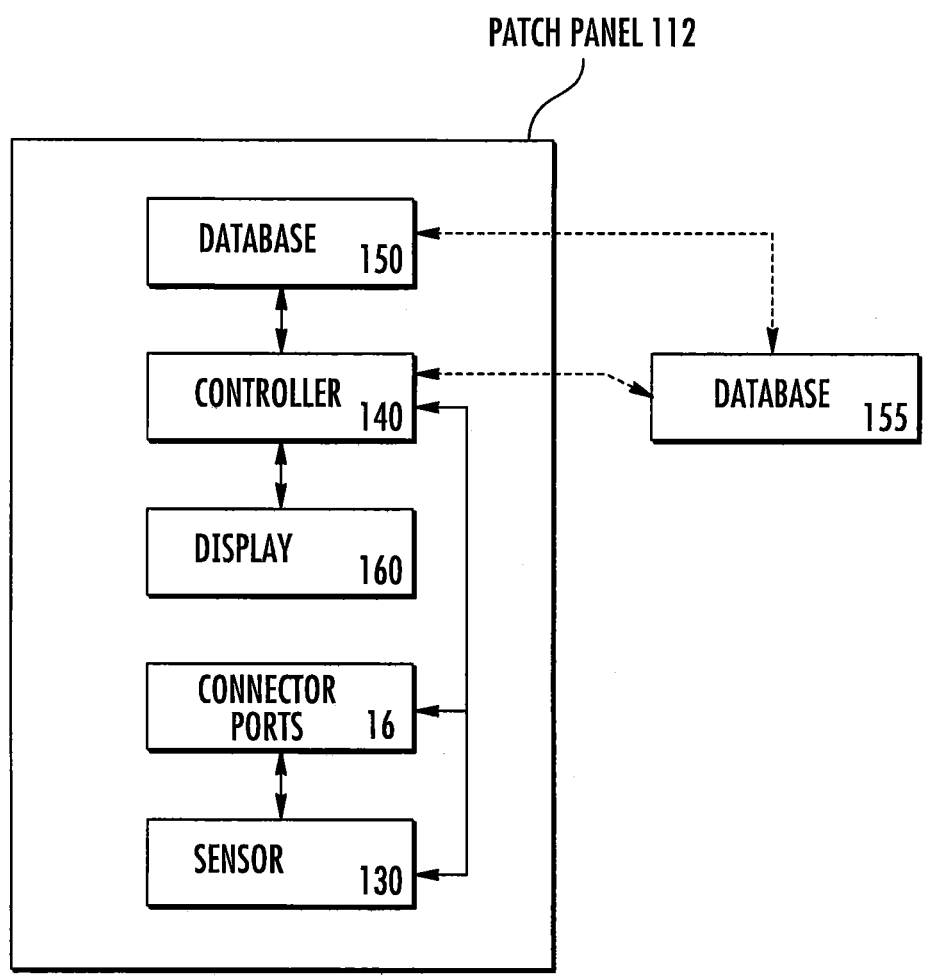
FIG. 2 is a block diagram of a patch panel and an optional external database, according to embodiments of the present invention.

Referring now to FIG. 2, a patch panel 112, according to some embodiments of the present invention, is illustrated. The illustrated patch panel 112 includes a plurality of connector ports 16. A patch cord 20 (FIG. 1) has opposite ends with a connector 22 secured to each end. Each connector 22 is configured to be removably secured within a respective connector port 16.

Each connector port 16 is configured to detect when a patch cord connector 22 is inserted within, and removed from, the respective connector port 16. This detection is generally accomplished by any type of sensor 130, including, but not limited to, mechanical sensors (e.g., mechanical switches), passive optical based sensors, RFID sensors and electrical based sensors. The sensor 130 may be integrated with the connector port 16 or may be adjacent to the connector port 16.

Each connector 22 of a respective patch cord 20 has the same unique identifier (i.e., uniquely paired identifier) in order to accurately track connectivity. In some embodiments, the identifier is in the form of programmable memory. In some embodiments, the programmable memory is Electrically Erasable Programmable Read-Only Memory (EEPROM). In some particular embodiments, the identifier may be a 1-Wire® device manufactured by Maxim Integrated Products. The identifier and the sensor 130, described above, may share components.

A controller 140 is typically electrically coupled to the connector ports 16 and/or the sensors 130. Therefore, the controller 140 is capable of monitoring when a patch cord 20 is inserted into any connector port 16, or removed from any connector port 16. The controller 140 is also capable of automatically keeping an accurate log of all changes that have occurred to the patch cords 20. In some embodiments, the controller 140 is external to the patch panel 112. For example, the controller 140 may be a controller mounted on a rack 10 (FIG. 1). In some embodiments, the controller 140 is electromagnetically coupled to the connector ports 16 and/or the sensors 130. For example, the controller 140 and the connector ports 16 and/or the sensors 130 could communicate via wireless signals rather than by direct electrical coupling.

The controller 140 may communicate with an internal or local database 150. The database 150 monitors and logs patch cord interconnections with the connector ports 16. Such information may be stored in memory, such as EEPROM, associated with the database 150.

In some embodiments, an external database 155 may be included. Either database 150, 155 may comprise a software database that is dedicated to monitor and log patch cord interconnections with the connector ports 16. Either database 150, 155 may comprise a web based or Microsoft Excel based program, and may provide user friendly connectivity information and connectivity logs, for example via a display associated with a personal computer, etc. In some embodiments, the external database 155 communicates with the controller 140. In some other embodiments, the external database 155 communicates with the internal database 150. The external database 155 and the controller 140 and/or the internal database 150 may communicate via wireless signals (e.g., by electro-magnetic coupling) or by direct electrical coupling.

The patch panel 112 includes or is in communication with a display 160. More particularly, the display 160 is in communication with the controller 140. The display 160 may communicate with the controller 140 via wireless signals (e.g., by electro-magnetic coupling) or by direct electrical coupling. For example, in some embodiments, the display 160 could be a display on a handheld computing device such as a smartphone or a tablet computer that communicates wirelessly with the controller 140 using, for example Bluetooth communications or Near Field Communication (NFC) technology. The display 160 displays port identification information and real-time patch cord connection information for each respective connector port 16, as described in more detail below. The displayed patch cord connection information for each connector port 16 is dynamically updated by the controller 140 as a patch cord 20 is inserted and removed from a respective connector port 16. As used herein, dynamically updating information (e.g., patch cord connection information) is defined as updating the information in real-time.

In some embodiments, the display 160 is positioned adjacent the connector ports 16. For example, the patch panel may include a front surface 113 (FIG. 3), and the display 160 may be integrated with the front surface 113 or may be visible through the front surface 113. The front surface 113 may be removable. In particular, the front surface 113 may be removed and/or replaced to repair or upgrade the patch panel 112. For example, the front surface 113 including the display 160 may be installed on a patch panel that previously included no labels or paper labels. Moreover, the front surface 113 including the display 160 may be installed when a previous display has malfunctioned or if the user wants to upgrade the display.

In some embodiments, a printed circuit board (PCB) is secured to the patch panel 112 and electrically coupled to the display 160. The PCB may be positioned adjacent to the display 160 and may provide power to the display 160. The PCB may provide interconnection with a controller and/or a controller circuit, such as the controller 140 and/or a circuit associated with the controller 140. In this regard, the PCB may serve to electrically couple the controller 140 and the display 160. As described below, in some embodiments, the display 160 comprises a plurality of adjacent, spaced-apart portions. The PCB or a plurality of PCBs may provide interconnection between the spaced-apart portions.

Figure 3:
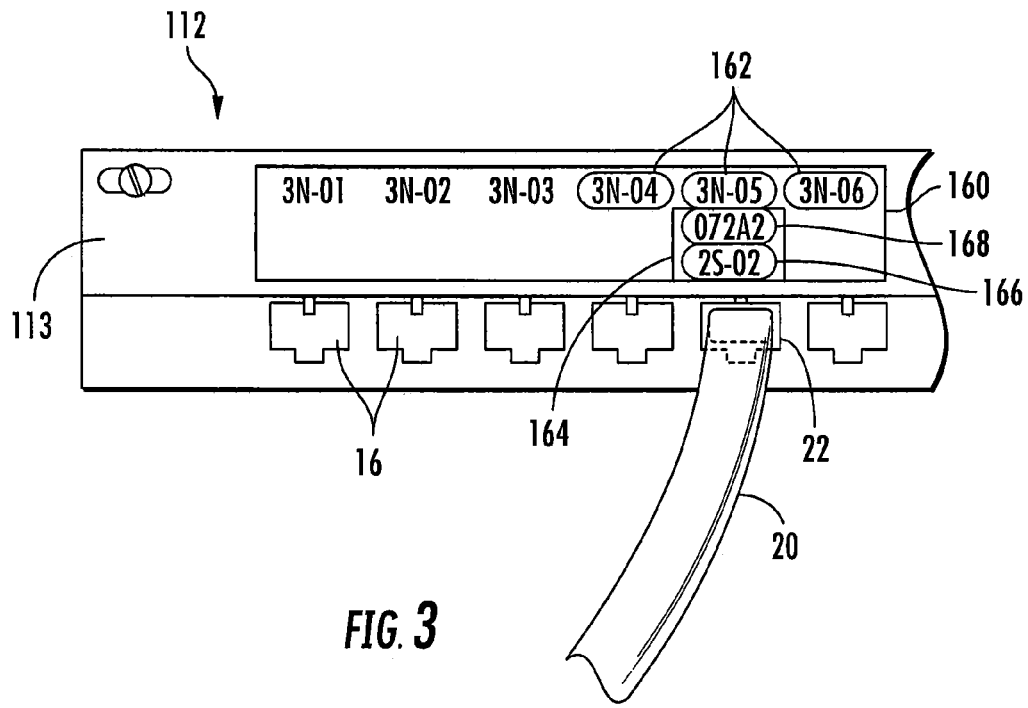
FIG. 3 is a fragmented front view of a patch panel, according to embodiments of the present invention.

Turning to FIG. 3, and according to some embodiments of the present invention, the display 160 is positioned adjacent to the connector ports 16. The display 160 is configured to display port identification information 162. The port identification information 162 identifies each connector port 16 on the display 160 adjacent to the respective connector port 16. In the embodiment shown in FIG. 3, the port identification information 162 is displayed adjacent every connector port 16, regardless of whether a patch cord 20 is inserted therein. In other embodiments, the port identification information 162 may be displayed only adjacent to connector ports 16 that have patch cords 20 inserted therein.

Patch cord connection information 164 may further be displayed on the display 160 adjacent the connector ports 16. The patch cord connection information 164 may be displayed adjacent the connector ports 16 when a patch cord 20 is inserted therein. In this regard, the patch cord information 164 is dynamically updated by the controller 140 as a patch cord 20 is inserted and removed from a respective connector port 16.

In some embodiments, and as shown in FIG. 3, the patch cord connection information 164 may include end point connection information 166 to accurately locate the end point (i.e., a different connector port 16) of any patch cord 20. Furthermore, because the connectors 22 of a respective patch cord 20 have the same unique identifier, the patch cord connection information 164 may also include patch cord identification information 168 based on the unique identifier of the patch cord 20. As shown in FIG. 3, the patch cord connection information 164 may be displayed only adjacent to connector ports 16 that have patch cords 20 inserted therein.

In the embodiment exemplified in FIG. 3, the display 160 is positioned above the connector ports 16. In this regard, port identification information 162 and/or patch cord connection information 164 for each connector port 16 appear directly above the respective connector port 16. In some other embodiments, the display 160 may be positioned beneath the connector ports 16 such that port identification information 162 and/or patch cord connection information 164 for each connector port 16 appear directly below the respective connector port 16. The display 160 may be mounted on or integrated with the patch panel 112 adjacent the connector ports 16. Alternatively, the display 160 may be positioned such that the display 160 is visible through a surface of the patch panel 112 adjacent the connector ports 16. As described above, the patch panel 112 may include a front surface 113, and the display 160 may be integrated with the front surface 113 or may be visible through the front surface 113.

The display 160 may be capable of displaying more detailed connectivity information about each of the connector ports 16. Such information may include the end points of the communications link associated with a particular connector port 16 (e.g., switch and wall outlet points). The detailed connectivity information for each connector port 16 may take up multiple lines on the display 160. However, because of space and other limitations, it may not be possible for the display 160 to simultaneously display this detailed connectivity information for all the connector ports 16. This is especially the case if the display 160 is already displaying port identification information 162 and/or patch cord connection information 164 for each connector port 16.

According to some embodiments, manipulation of a user input device 170 (FIG. 4) allows a user to navigate between different layers of information on the display 160. The user input device 170 may comprise a rotatable scroll wheel. According to some embodiments, pressing the scroll wheel takes a user from a mode such as the one seen in FIG. 3, wherein port identification information 162 and/or patch cord connection information 164 is displayed, to a mode such as the one seen in FIG. 4, in which detailed connectivity information 172 associated with a particular connector port 16 is displayed. Such information may include the end points of the communications link associated with a particular connector port 16 (e.g., switch and wall outlet points). More particularly, the detailed connectivity information may represent a full communications link (i.e., inclusive of endpoints beyond the patch cord connection information 164). For example, as illustrated in FIG. 4, each block of information in the connectivity information 172 may represent an identifier for a building, floor, room, rack, patch panel, connector port or the like.

Figure 4:
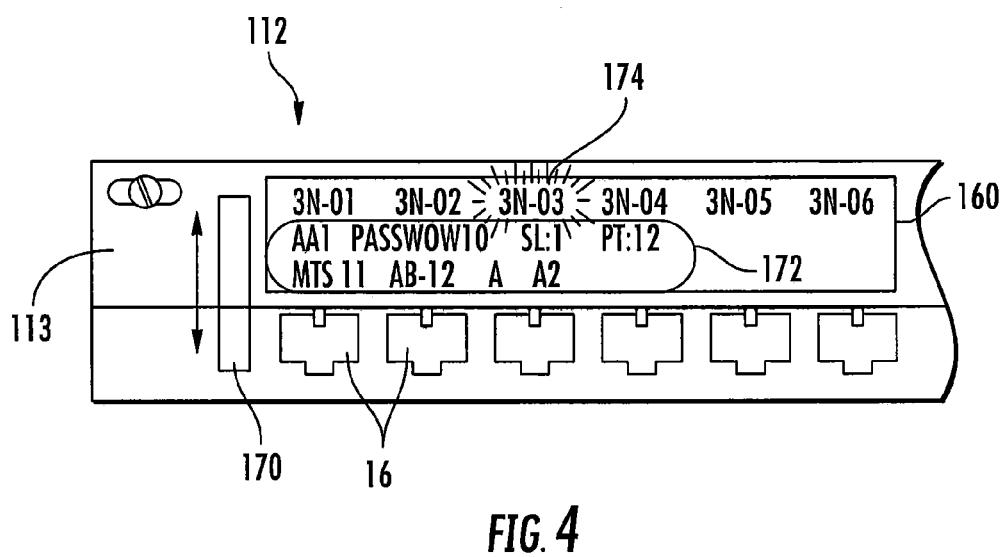
FIG. 4 is a fragmented front view of a patch panel, according to embodiments of the present invention.

Still referring to FIG. 4, once the wheel is pressed, it may then be rotated to scroll through the connector ports 16. As a particular port 16 is selected, its port identification 174 is highlighted and the detailed connectivity information 172 for that port 16 is displayed.

Although the user input device 170 has been exemplified as a rotatable scroll wheel, it is understood that the user input device 170 may comprise any device known to those skilled in the art. It is further contemplated that the detailed connectivity information 172 may scroll across the display 160 automatically rather than in a user initiated fashion.

As illustrated in FIG. 4, the user input device 170 may be adjacent to the display 160. In some embodiments, the user input device 170 may be positioned away from the display 160 and may allow the user to remotely perform at least some of the functions described above. The user input device 170 may be logically correlated to the display 160 to facilitate remote operation.

The display 160 and the connectivity information provided thereon may comply with ANSI/TIA/EIA/606A standards, which provide guidelines for record keeping, label placement and link identification. The ANSI/TIA/EIA/606A standards are an evolving set of standards. For example, the ANSI/TIA/EIA/606A standards are a revised version of the ANSI/TIA/EIA/606 standards. It is understood that the display 160 and the connectivity information provided thereon may comply with the most recent revision of the ANSI/TIA/EIA/606A standards or the equivalent. The display 160 and the connectivity information provided thereon may further comply with other national and international standards.

The display 160 may be capable of toggling between a custom labeling scheme, such as the modes shown in FIGS. 3 and 4, and an ANSI/TIA/EIA/606A (or like national or international standard) compliant scheme. The custom labeling scheme may represent a company or organization specific standard and may be a default setting. In some embodiments, the user may toggle between a custom labeling scheme and an ANSI/TIA/EIA/606A (or like national or international standard) compliant scheme using the user input device 170. In some embodiments, wherein the user input device 170 comprises a scroll wheel, the user may press the scroll wheel to toggle between a custom labeling scheme, such as the modes shown in FIGS. 3 and 4, and an ANSI/TIA/EIA/606A (or like national or international standard) compliant scheme.

In the embodiments shown in FIGS. 3 and 4, the display 160 comprises a plurality of adjacent, spaced-apart portions such that each portion spans only some (e.g., six) of the plurality of connector ports 16 of the patch panel 112. In some embodiments, each portion of the display 160 may have a footprint about 100 millimeters by about 15 millimeters. In some embodiments, each portion of the display 160 may have a footprint no greater than 2000 square millimeters. Alternatively, in some embodiments, the display 160 may be continuous and may be adjacent to all the connector ports 16 of the patch panel 112. The size of the display 160 and/or each portion of the display 160 may be consistent with and/or dependent on the mounting pitch of the connector ports 16. In this regard, the size of the display 160 and/or each portion of the display 160 may be consistent with and/or dependent on the type of connector ports 16 (e.g., SC, LC, RJ45, MPO) associated with the patch panel 112.

The display 160 may be any type of display, including, but not limited to, a liquid crystal display (LCD), a light emitting diode (LED) display an organic light emitting diode (OLED) display, and a vacuum fluorescent display (VCD). In some embodiments, the display 160 may be backlit and/or make use of inverted colors to ensure viewability in dark spaces such as cabinets and telecommunication closets.

Figure 5:
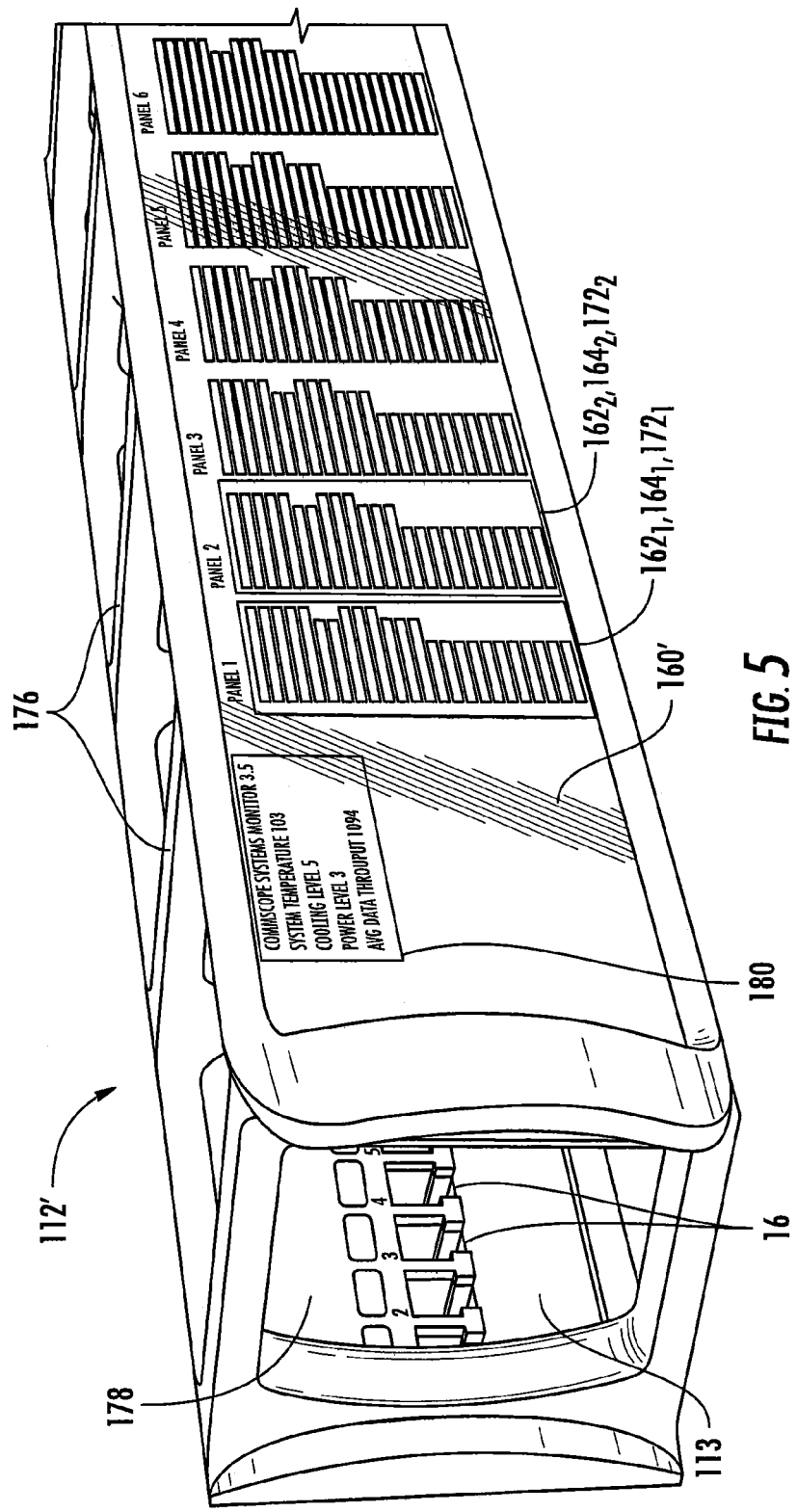
FIG. 5 is a fragmented perspective view of a patch panel, according to embodiments of the present invention.

Turning now to FIG. 5, a patch panel 112' is illustrated according to some embodiments of the present invention. The patch panel 112' shares the same features as the patch panel 112 described above with the following differences. The patch panel 112' includes a plurality of arms 176 extending outwardly away from the patch panel front surface 113. An electronic display 160' is attached to the distal ends of the arms 176 and positioned in front of or substantially in front of the connector ports 16. As illustrated, the arms 176 may include openings 178 through which the connector ports 16 and/or cords connected therewith may be accessed.

Thus, the display 160' may be spaced outwardly from the connector ports 16. This outward spacing allows for a relatively large display 160', as compared to the display 160 that is integrated with or visible through a front surface 113 of the patch panel 112. The display 160' may have a length that spans a substantial portion of a length of the patch panel 112'.

The relatively large size of the display 160' may allow for more information to be displayed simultaneously. For example, the port identification information $162_1$ and/or patch cord connection information $164_1$ and/or detailed connectivity information $172_1$ for each connector port 16 of the patch panel 112' may be displayed simultaneously. This information can include all of the data as described above in reference to the port identification information 162 and the patch cord connection information 164 and the detailed connectivity information 172.

The port identification information $162_1$ and/or patch cord connection information $164_1$ and/or detailed connectivity information $172_1$ associated with the connector ports 16 of the patch panel 112' may take up substantially all the space on the display 160'. In some other embodiments, because of its relatively large size, the display 160' can also display connectivity information associated with other patch panels (e.g., other patch panels on the same rack). For example, port identification information $162_2$ and/or patch cord connection information $164_2$ and/or detailed connectivity information $172_2$ for each connector port 16 of one or more different patch panels (e.g., a second patch panel on the same rack) may be displayed.

Thus, the display 160' may display connectivity information for each of the ports 16 of the patch panel 112' (i.e., each of the ports 16 of the patch panel 112' that the display 160' is adjacent to), or may display connectivity information for the patch panel 112' and one or more other patch panels of a rack or a cabinet. In some embodiments, various information may scroll along the display 160'; such scrolling may be automatic or may be user initiated. In some other embodiments, the display 160' may be a touch screen display. Such a touch screen may allow a user to scroll through information, or may allow a user to view information associated with different patch panels that are in communication with the display, for example.

In some embodiments, the display 160' may be configured to display general information 180 in addition to the connectivity information. Thus, the relatively large display 160' can conveniently display the general information 180, which is typically displayed remotely from a patch panel, along with labeling or connectivity information associated with the ports 16. The general information 180 can include, for example, environmental data such as the current system temperature. The general information 180 can also include such data as the current cooling level, the current power level, the current average data throughput, and the number or percent of connector ports available and/or in use.

In some embodiments, the display 160' is optically semi-transparent or semi-translucent to allow a user to see through the display 160' to the patch panel 112', and particularly to the connector ports 16 and cables connected therewith.

In some embodiments, the arms 176 can include channels or grooves (not shown) for routing of cables.

Figure 8A:
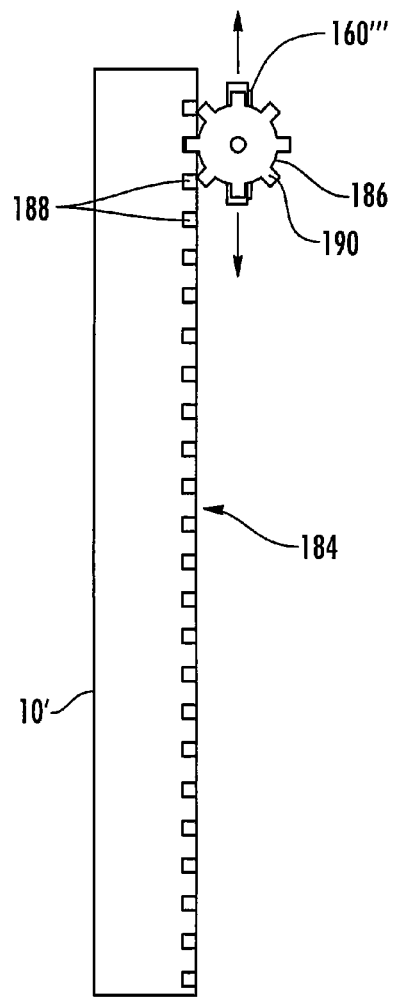
FIG. 8A is a side view of a frame of a patch panel system, according to some embodiments of the present invention.
Figure 8B:
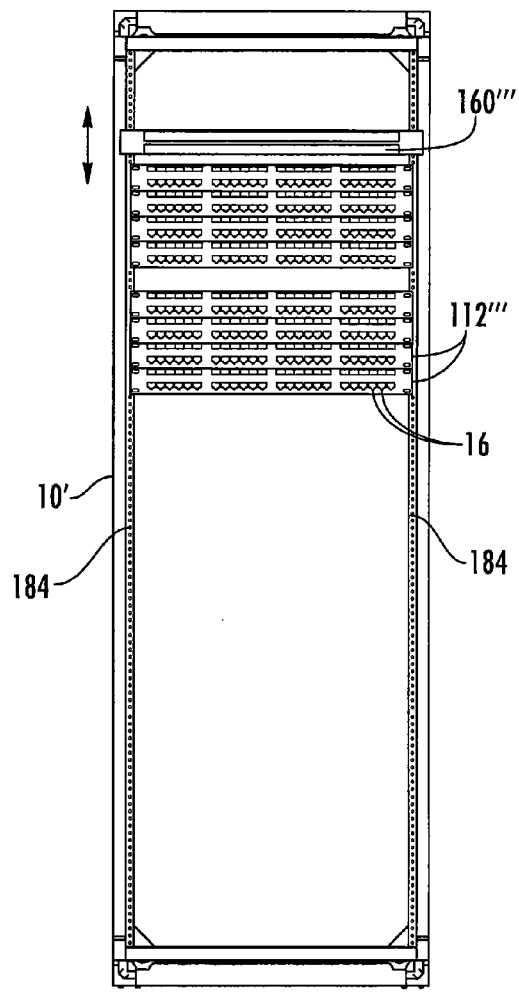
FIG. 8B is a front view of the frame of FIG. 8A.

Turning now to FIGS. 8A and 8B, a patch panel system is illustrated. The system includes a frame 10' configured to support equipment mounted thereto in a plurality of spaced-apart mounting locations. In some embodiments, the frame 10' comprises a rack, such as the rack 10 illustrated in FIG. 1, for example. One or more patch panels 112''' are mounted to the frame 10' in spaced-apart locations. The system also includes at least one controller associated with the one or more patch panels 112'''. The at least one controller monitors and logs the patch cord connectivity for the one or more patch panels 112'. In some embodiments, the controller is a rack controller. In some other embodiments, each patch panel 112''' can include a dedicated controller, such as the controller 140 described in detail above.

The patch panel system also includes a display 160''' movably secured to the frame 10'. The display 160''' is configured to display patch cord connectivity information monitored by the at least one controller for the one or more patch panels 112'''. The display 160''' is movable along the frame 10' (as indicated by the arrows). The display 160''' generally faces away from the patch panels 112'''.

In some embodiments, the frame 10' includes first and second vertically oriented members 184 in an opposing spaced-apart relationship. The display 160''' can be movably secured to at least one of the two vertically oriented members 184.

In the illustrated embodiment, the display 160''' is attached to a wheel 186. The frame 10' includes a plurality of apertures 188. For example, the apertures 188 may be positioned in one or both of the vertically oriented members 184 (the apertures 188 may be thought of as forming one or more "tracks"). The wheel 186 has a plurality of outwardly extending projections 190 sized and configured to fit within the apertures 188. The wheel 186 may be rotatable such that an adjacent projection 190 fits within an adjacent aperture 188 to allow translational movement of the display 160''' (i.e., up and down movement as indicated by the arrows) while also providing electronic communication between the display 160''' and the at least one controller.

The wheel 186 and/or the display 160''' may include mechanisms to prevent the display 160''' from rotating along with the wheel 186. For example, a gear may be connected to the wheel 186 and the display 160' may be connected to the same gear or an associated gear, with the gear(s) configured to offset any rotational movement of the wheel 186. Alternatively, the display 160''' may be relatively loosely attached to a shaft associated with the wheel 186 such that, when the wheel 186 rotates, the shaft "slips" at its interface with the display 160'''. In this regard, the shaft urges the display 160''' up or down as the wheel 186 rotates, but does not urge the display 160''' to rotate with the wheel. Other mechanisms to prevent rotation of the display 160''' are contemplated and are well known to those of skill in this art.

In some embodiments, each aperture 188 includes a contact therewithin. The contacts may provide power to the display 160''' and/or may provide communication to the display 160'. In particular, the contacts may serve as a communication link between the at least one controller and the display 160'''.

The apertures 188 may be positioned such that, when one of the projections 190 of the wheel 186 fits in one of the apertures 188, the display 160''' may be positioned adjacent the connector ports 16 associated with a particular patch panel 112'''. In other words, each aperture may be associated with a particular patch panel 112'''.

In various embodiments, the apertures 188 associated with a particular patch panel 112''' may be positioned such that the display 160''' is above, below, or substantially in front of the patch panel 112''' when a projection 190 of the wheel 186 is positioned in the aperture 188.

The connectivity information on the display may include information such as the port identification information 162 and/or patch cord connection information 164 and/or detailed connectivity information 172 described above in reference to FIGS. 3 and 4.

Furthermore, the display 160''' may be relatively large because it does not need to be integrated with or visible through a front surface of a patch panel 112'''. Thus, the display 160''' may be able to display information such as the port identification information $162_1$ and/or patch cord connection information $164_1$ and/or detailed connectivity information $172_1$ for each connector port 16 of the patch panel 112' adjacent the display 160''', and may also be able to display information such as the port identification information $162_2$ and/or patch cord connection information $164_2$ and/or detailed connectivity information $172_2$ for each connector port 16 of one or more different patch panels 112''', as described above in reference the display 160'. Moreover, the display 160''' may have a length that spans a substantial portion of a length of the patch panel 112'''.

It is understood that the display 160''' may be movable along the frame 10' in ways other than described above. For example, the display 160''' may be connected to one or more carriers that are configured to move the display up and down the frame 10'. The carriers may be in tracks, such as continuous tracks, and may be controlled such that the carriers stop at certain vertical positions such that the display is positioned above, below, or substantially in front of a particular patch panel 112'''. The track can include a plurality of contacts, similar to the contacts described above with regard to the apertures 188, to provide power to the display 160''' and/or to communicate information to the display 160'''. In some other embodiments, the display 160''' may itself be movable and positionable along one or more tracks. For example, the display 160''' may include arms (such as the arms 176 associated with the display 160' in FIG. 5), and one or more of the arms could couple with one or more tracks.

There may be one track, or there may be more than one "track" in which a carrier or a wheel moves. For example, there may be two vertical continuous tracks or two vertically disposed plurality of apertures each forming a "track," and these tracks may be located in or on the frame 10' or may be in or on the vertically oriented members 184. Thus, a carrier or wheel may move along each of the tracks, and the display may be attached to both of the carriers or wheels.

The display 160''' may be moved manually by an operator to a desired position. In this regard, the apertures 188 and/or the projections 190 can be configured to provide audible and/or tactile feedback to a user to help ensure the projection 190 is properly positioned in the aperture 188. In embodiments using a carrier other than the wheel 186, the track may include grooves positioned to provide the same type of feedback to a user.

Furthermore, the display 160''' may be moved automatically in response to a command from a user. There may be a user interface device positioned on or adjacent the frame 10', the display 160''', or a user interface device may be positioned remotely away from the system. The display 160''' may comprise a touch screen, similar to as described in reference to the display 160' of FIG. 5, and the touch screen may allow a user to move and/or position the display 160''' as desired.

Figure 6:
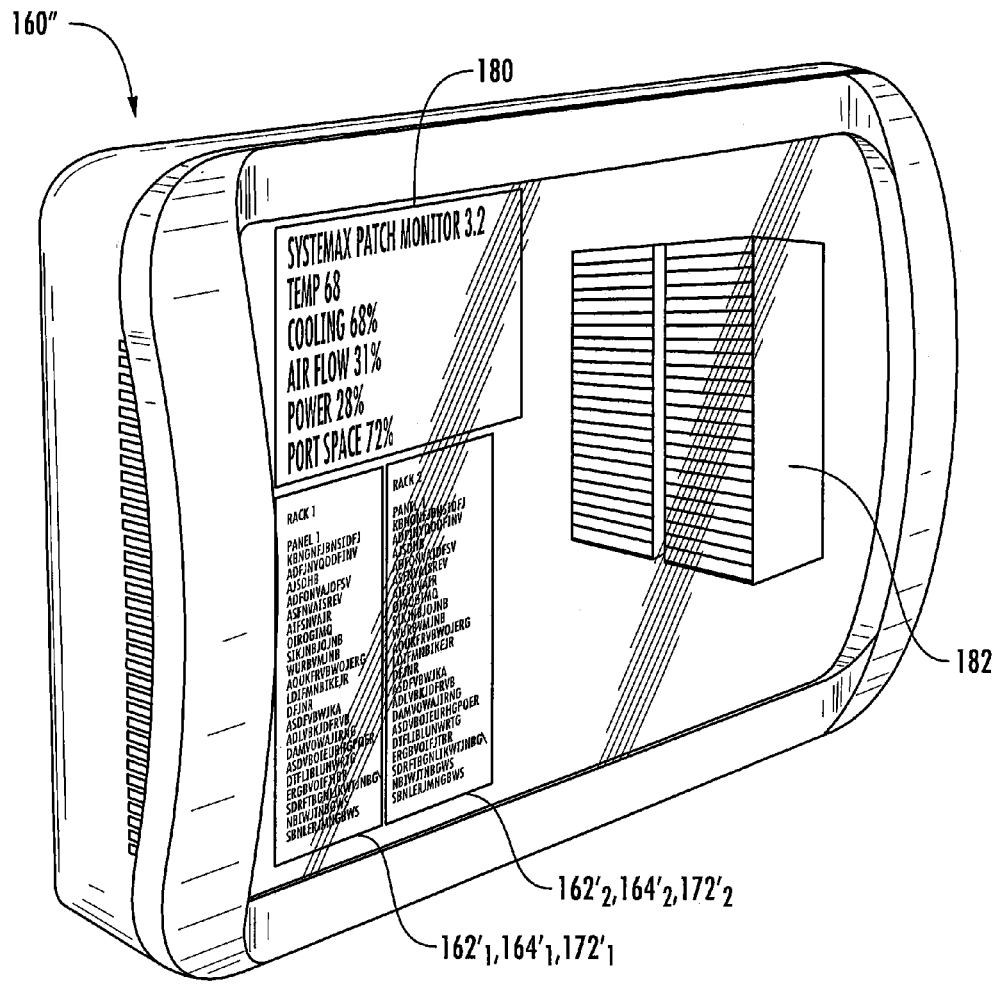
FIG. 6 is a perspective view of an electronic display for use with patch panels according to embodiments of the present invention.

Turning now to FIG. 6, a display 160" for use with patch panels or groups of patch panels, according to some embodiments of the present invention, is illustrated. The display 160" may be mounted to a patch panel, to a rack, to a stand, to a wall, etc. For example, the display 160" could be removably mounted to a frame, such as the rack 10 illustrated in FIG. 1. More particularly, the display 160" could be removably mounted to a side of the rack. The display 160''' may be removably mounted at about eye-level for ease of use. Alternatively, the display 160" could be portable; for example, the display 160" could be the display of a wireless terminal such as a PDA or smartphone. Like the previously described displays 160, 160', and 160''', the display 160" communicates with one or more controllers associated with one or more patch panels.

The display 160" may be particularly useful in environments where it is desirable to monitor a plurality of patch panels, such as in a telecom closet or a data center. The display 160" may be configured to display connectivity information associated with patch panels of one or more racks and/or one or more cabinets, for example. In the illustrated embodiment, port identification information $162'_1$ and/or patch cord connection information $162'_1$ and/or detailed connectivity information $172'_2$ of various patch panels of a first rack and port identification information $162'_2$ and/or patch cord connection information $164'_2$ and/or detailed connectivity information $172'_2$ of various patch panels of a second rack can be displayed. This information can include all of the data as described above in reference to the port identification information 162 and the patch cord connection information 164 and the detailed connectivity information 172.

In some embodiments, the display 160" comprises a touch screen configured to show a graphical representation of the racks or cabinets, such as the graphical representation 182 showing a pair of racks. Thus, a user may be able to touch a particular panel in the graphical representation 182, to display that panel's connectivity information, such as the connectivity information $162'_1$ and $162'_1$. In other embodiments, a separate user interface (not shown) may allow a user to select a particular patch panel. In still other embodiments, various information may scroll along the display 160"; such scrolling may be automatic or may be user initiated.

The display 160" may simultaneously display general information 180, such as the information described above in reference to the display 160' of FIG. 5.

It will be understood that various features of the displays 160, 160', 160" and 160''' are interchangeable. It will further be understood that any of the displays are configured to display detailed connectivity information associated with a particular connector port. Such detailed connectivity information may include information about associated switches, servers, storage devices, and the like. It will also be understood that each of the displays 160, 160', 160" and 160''' communicate with at least one controller, such as the controller 140 described above and illustrated in FIG. 2. This communication may be wireless or may be via direct electrical coupling.

As described in more detail above, the displays and/or their associated controllers may communicate with a database, such as an external database. The displays may be used with patch panels that do not include various sensing technology (e.g., no port sensing). These "passive panels" may be updated remotely (for example, using the database) such that any of the displays disclosed herein may still display comprehensive connectivity information. Manual updating may also be useful in other configurations, such as where the cords do not include identifiers.

Figure 7A:
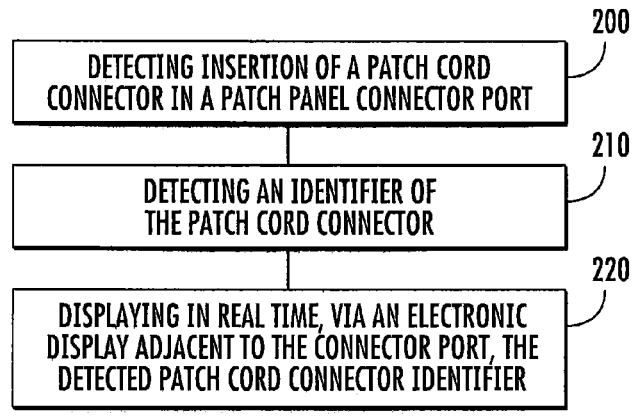
FIGS. 7A-7C are block diagrams illustrating methods of displaying connection information for a connector port of a patch panel in a communications patching system.
Figure 7B:
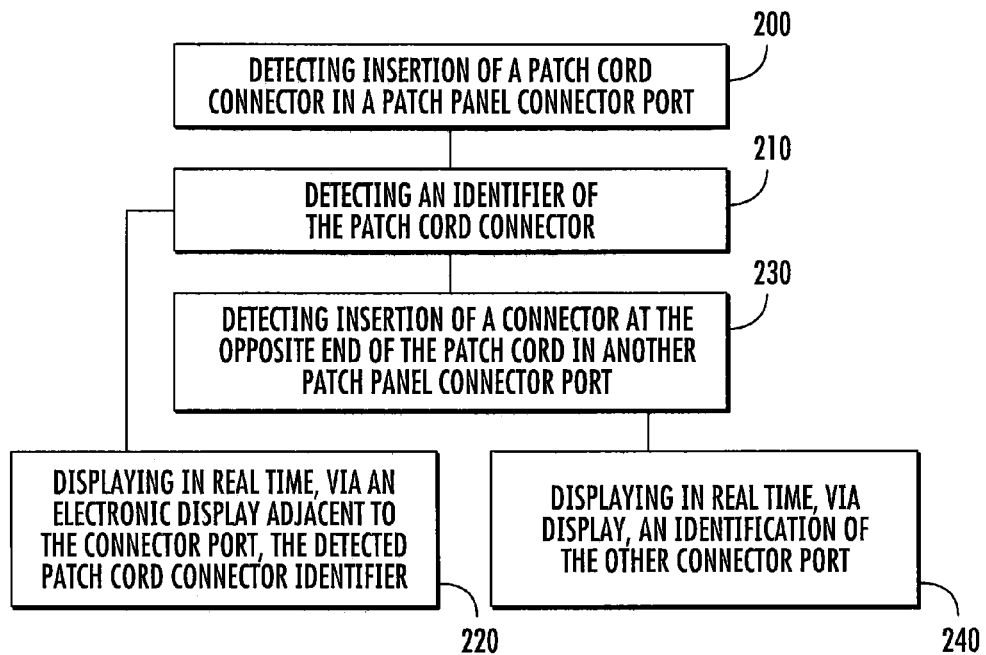
Figure 7C:
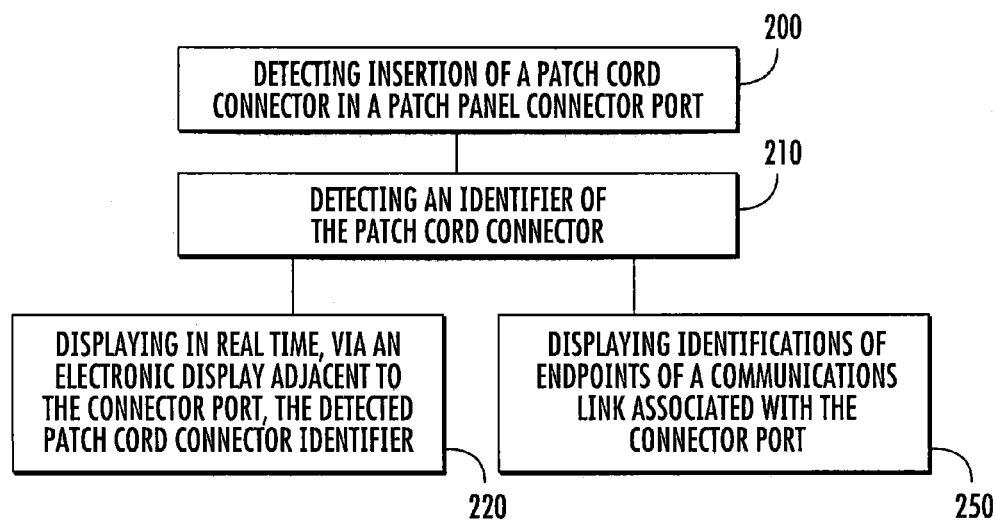

Methods of displaying patch cord connection information for a connector port of a patch panel, according to some embodiments of the present invention, are illustrated in FIGS. 7A-7C. One method (FIG. 7A) includes the steps of detecting insertion of a patch cord connector in a patch panel connector port (block 200), detecting an identifier of the patch cord connector (block 210) and displaying in real time the detected patch cord connector identifier via an electronic display adjacent to the connector port (block 220).

Another method (FIG. 7B) further includes detecting insertion of a connector at the opposite end of the patch cord in another patch panel connector port (block 230) and displaying an identification of the other connector port via the electronic display (block 240). Yet another method (FIG. 7C) further includes displaying identifications of end points of a communications link associated with the connector port (block 250).

Currently, there is a large installed base of passive (i.e., non-intelligent) patch panels and network equipment that do not include capabilities for automatically sensing patching changes and for then notifying a system controller to automatically update a connectivity database to reflect such patching changes. When technicians execute patching changes at these passive (non-intelligent) patch panels, they must update the connectivity database later, typically by entering the completed patching changes into the connectivity database using, for example, a computer. Unfortunately, when the computer that is used to update the connectivity database is not accessible at the patching field where the patching changes are made, then there necessarily is a delay between execution of the patching change and the updating of the connectivity database. In some instances, technicians may wait for hours or days before updating the connectivity database. If other technicians execute further patching changes or equipment changes before the connectivity database is updated, problems may ensue. Moreover, there is always a possibility that the technician forgets to input the changes at all, introducing errors into the connectivity database that will need to be tracked down and corrected later.

One method of avoiding such potential errors in the connectivity database is to replace the installed base of passive patch panels and network equipment with intelligent patch panels and network equipment that automatically track patching changes. However, such replacement may be very costly. Pursuant to further embodiments of the present invention, methods are provided which may partially or fully automate the process of recording patching changes that are made at passive patch panels and network equipment that may reduce the likelihood that errors arise in the connectivity database.

Figure 9:
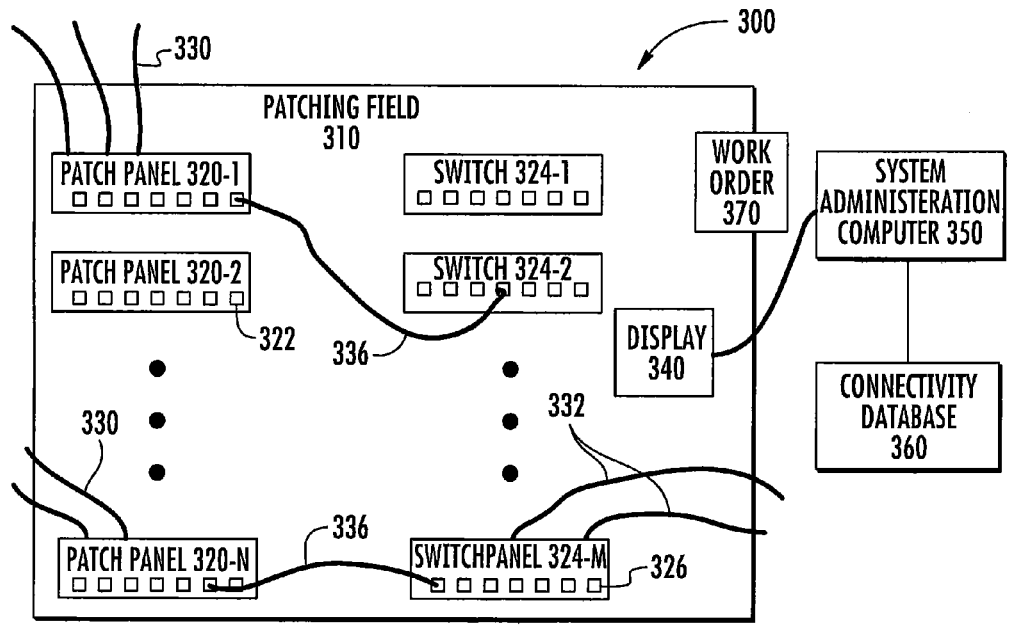
FIG. 9 is a schematic block diagram of portions of a communications system that may implement methods according to embodiments of the present invention.

In particular, FIG. 9 is a schematic block diagram of portions of a communications system/network 300 according to further embodiments of the present invention. As shown in FIG. 9, the communications system 300 includes a patching field 310. The patching field 310 may include, for example, a plurality of rack mounted patch panels 320-1 through 320-N. Each patch panel 320 may include a plurality of connector ports 322. Horizontal cables 330 may extend from the back end of each patch panel connector port 322 (only a few representative horizontal cables 330 are depicted in FIG. 9). These horizontal cables 330 may connect (either directly or indirectly) to various other elements of the communications system 300 such as other patch panel or wall-mounted connector ports, network equipment or end user equipment. In the depicted embodiment, the patching field 310 further includes a plurality of rack-mounted network switches 324-1 through 324-M. Each network switch 324 may include a plurality of connector ports 326. Cables or patch cords 332 may connect each network switch 324 to other network equipment such as servers, routers, memory devices and the like. A plurality of patch cords 336 may be used to selectively interconnect the connector ports 322 on the patch panels 320 with the connector ports 326 on the network switches 324.

The communications system 300 further includes a system administration computer 350 and a connectivity database 360. The connectivity database 360 may include information on all of the patching connections within the communications system 300, specifically including identification as to all of the patch cord connections between patch panels (in cross-connect style patching fields) and as to all of the patch cord connections between patch panels and network equipment (in interconnect-style patching fields such as the example patching field 310 depicted in FIG. 9).

As is further shown in FIG. 9, at least one display device 340 is provided at the patching field 310. The display 340 may be connected by a wireless and/or wired connection to the system administration computer 350 and/or to the connectivity database 360. In some embodiments, the display 340 may be the display on a rack manager or controller that is included, for example, on a rack of patch panels, network switches, network equipment or the like. In other embodiments, the display 340 may be the display on a portable computing device such as, for example, a tablet computer or a smartphone that communicates with the system administration computer 350 and/or to the connectivity database 360 using, for example Bluetooth communications or Near Field Communication (NFC) technology to wirelessly communicate with a controller at the patching field that has a hardwired communication link to the system administration computer 350 and/or to the connectivity database 360. Pursuant to still further embodiments, the display 340 may be a display that is installed in a retrofit operation on or near a patch panel or network device that is subject to a patching connection change (e.g., installed on an equipment rack on which the patch panel or network switch is mounted).

When a patching change is required (i.e., when a patch cord 336 is to be added, removed or moved to connect different connector ports), a control device of the communications system 300 such as the system administration computer 350 may generate an electronic work order 370. The electronic work order 370 may be a work order that is suitable for display on an electronic display device such as the display 340. The electronic work order 370 may be transmitted from the system administrator computer 350 to the display 340 where it is displayed to a technician. The electronic work order 370 may identify the patching change that is required by, for example, identifying the type of patching change (e.g., adding a new patching connection, deleting an existing patching connection or changing an existing patching connection) and may identify the patch panel connector ports 322 and/or network equipment connector ports 326 that are impacted by the patching change. The use of electronic work orders for implementing patching changes is discussed, for example, in U.S. Pat. No. 6,522,737, the entire contents of which are incorporated herein by reference.

Figure 10:
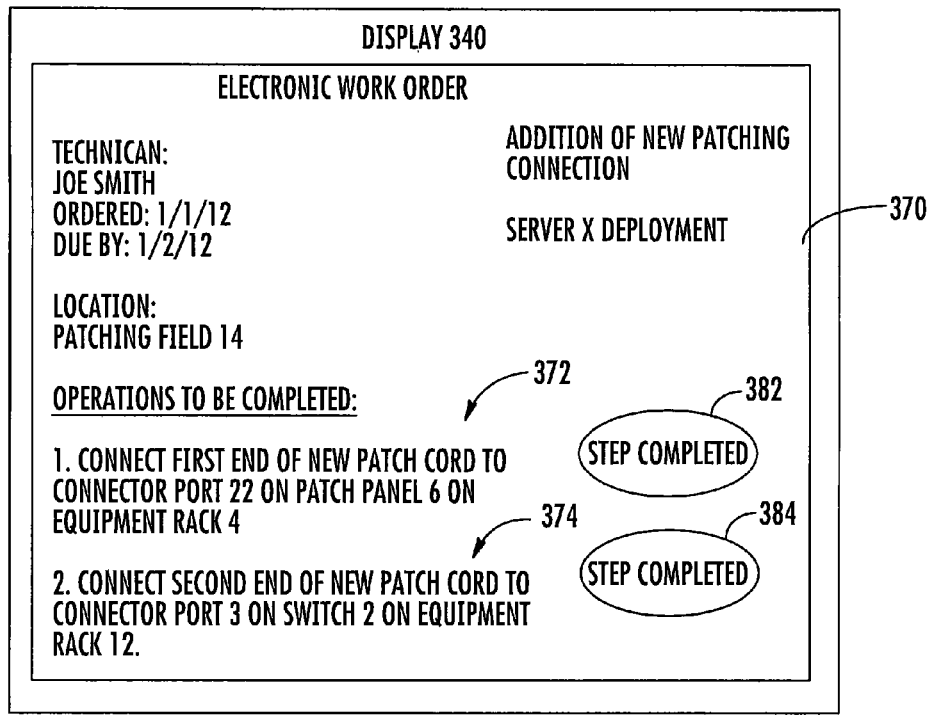
FIG. 10 is a schematic illustration of an electronic work order according to embodiments of the present invention.

In some embodiments, the electronic work order 370 may comprise step-by-step instructions that specify each operation required to complete the patching change. These instructions may comprise written instructions, graphics and any other appropriate indicators that held guide the technician to perform the patching change. For example, connector ports on servers often are not labeled, and therefore the step-by-step instructions for a patching change involving a server connector port may include a picture or other graphic that includes an indicator identifying the connector port on the server that is involved in the patching change. FIG. 10 is a schematic illustration of such a step-by-step electronic work order 370 displayed on a touch-screen display 340. As shown in FIG. 10, the electronic work order 370, which in this case specifies the addition of a new patching connection, lists each step 372, 374 that is required to complete the patching change. Additionally, the electronic work order 370 includes "step completed" icons 382, 384 that are positioned adjacent the respective enumerated steps 372, 374.

The electronic work order 370 may be displayed to the technician via the display 340. In this manner, the technician is conveniently provided a paperless work order at the location of the equipment that is involved in the patching change. After reviewing the electronic work order 370, the technician may then implement the first step 372 of the patching change. For instance, in the example illustrated in FIG. 10 where the patching change is adding a new patching connection, the first step 372 of the patching change is installing the first end of the new patch cord into connector port 22 on patch panel 6 on equipment rack 4. Once the technician performs this first step 372, the technician may press the icon 382 on the touchscreen display 340. In response to this action by the technician (i.e., the activation of an input mechanism in the form of the technician pressing the icon 382), a message is sent to the system administration computer 350 that the first step 372 of the patching change identified in electronic work order 370 has been completed. The system administration computer 350 may then update the connectivity database 360 accordingly. In embodiments that do not include a touch screen display 340, the technician may use a different type of user input device that is associated with the display 340, such as a keyboard, pointer, etc., to cause a computing device that is associated with the display 340 to send the message to the system administration computer 350 and/or the connectivity database 360.

Next, the technician may perform the second step 374 of the patching change. Once the technician performs the second step 374, the technician may press the icon 384 on the display 340. In response to this action by the technician (i.e., the activation of an input mechanism in the form of the technician pressing the icon 384), a message is sent to the system administration computer 350 that the second step 374 of the patching change identified in electronic work order 370 has been completed. The system administration computer 350 may then update the connectivity database 360 to reflect the addition of the new patching connection. In this manner, the means for updating the connectivity database 360 may be largely automated (as the technician may only need to, for example, press a few buttons on the display 340), and the updates to the connectivity database 360 may be performed essentially in real time.

In some embodiments (such as the embodiment of FIG. 10 discussed above), the electronic work order 370 may be configured so that the technician is instructed to press a button or activate some other input mechanism after the completion of each step of a patching change operation. In other embodiments, the technician may complete the entire patching change operation and only then notify the connectivity database 360 that the patching change has been completed. This may allow the technician to update the connectivity database 360 by, for example, pushing a single button on a touch screen display that confirms that the patching operation has been completed. In some embodiments, the communications system 300 may be configured so that it will not deliver a subsequent electronic work order 370 to the technician until the technician confirms (via inputting information using the display 340) that the current electronic work order 370 has been completed or indicates that completion of the electronic work order 370 has been postponed or delayed. This feature may act as a safeguard that requires a technician to interact with the display 240 during (or immediately after) the execution of each electronic work order 370, which may increase the likelihood that the technician timely and accurately uses the display 340 to update the connectivity database 360 upon the completion of each electronic work order 370.

In some embodiments, the display 340 may only support patching activities for a single equipment rack, or may only display information relating to patching activities at one equipment rack at any given time. This may help reduce errors that may occur as technicians input information regarding patching changes when selecting equipment ports for patching or tracing. In other embodiments, however, patching activities regarding multiple equipment racks may be displayed on a single display 340.

As noted above, the display 340 that is provided at the patching field 310 may comprise, for example, (1) a display on a rack manager or controller, (2) a display that is retroactively installed on or adjacent to the patch panel or network switch or (3) a display on a portable computing device such as, for example, a tablet computer or a smartphone that communicates wirelessly with the system administration computer 350 and/or to the connectivity database 360 using, for example Bluetooth communications or NFC technology. In other embodiments, other emerging display technologies may be used. For example, Google Glass® is a new product that implements mobile computing technology into a pair of eyeglasses such as a pair of sunglasses to provide "intelligent" sunglasses. Information is displayed through at least one of the lenses of the pair of intelligent eyeglasses for viewing by an individual wearing the glasses (in some cases the lenses may be omitted). The individual wearing the pair of intelligent eyeglasses may input information via voice commands that are received through a microphone on the intelligent eyeglasses. Thus, in some embodiments, the steps of a patching change may be sequentially displayed to a technician on the display of the intelligent eyeglasses, and as each step is completed by the technician the technician can update the connectivity database by, for example, a voice command of "STEP COMPLETED" that is received via a microphone o the intelligent eyeglasses and used to update the connectivity database. The next step in the patching change may then be displayed on the display of the eyeglasses. Thus, it will be appreciated that in further embodiments a wearable display such as a display incorporated into a pair of intelligent eyeglasses may be used to implement the display 340.

As yet another example, wearable gesturable interfaces are being developed that include, for example, a "pocket" computing device, a pocket projector and a camera. An example of such a system is the SixthSense system, which is described at www.pranavmistry.com/projects/sixthsense. The projector may be used to project information onto any convenient surface, turning such surfaces into a display device. The camera may be used to track the movement of a user's fingers, and thus the "surface" display can be configured to act like the equivalent of a touchscreen display by tracking the user's finger movements on the display. Thus, as another example, a wearable gesturable interface may be used to implement the display 340 in other embodiments.

Figure 11:
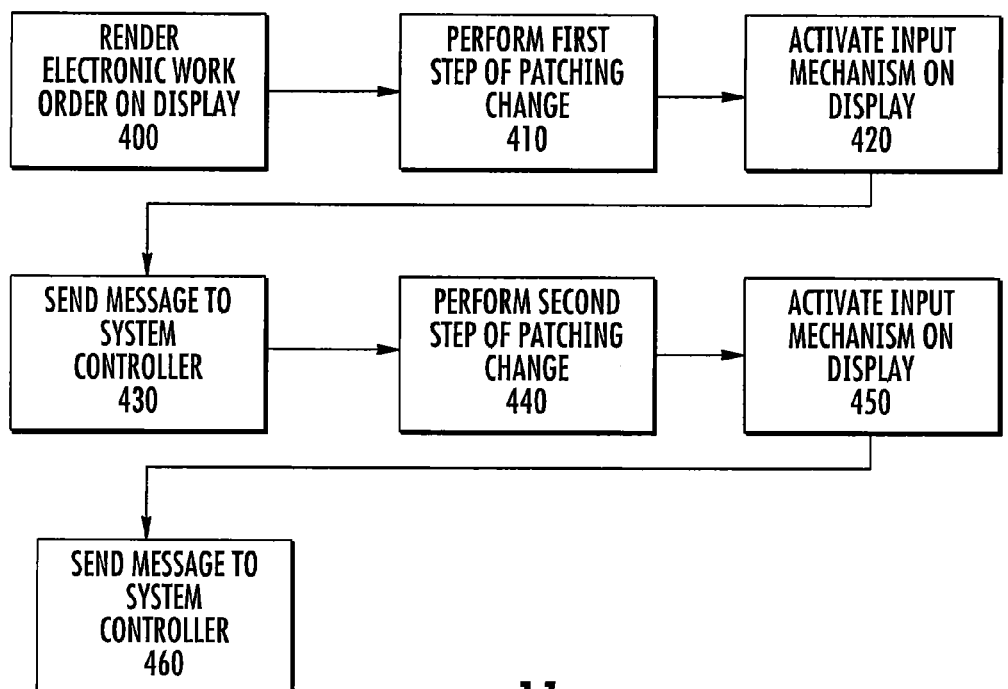
FIG. 11 is a flow chart illustrating methods of executing patching connection changes according to embodiments of the present invention.

FIG. 11 is a flow chart illustrating methods of executing patching connection changes according to embodiments of the present invention. As shown in FIG. 11, operations may begin with an electronic work order being displayed to a technician on a display that is located in a patching field that includes the patching connection that is to be added, deleted or changed (block 400). The technician may then perform the first step of the patching change specified in the work order (block 410). Upon completion of this step, the technician activates an input mechanism on the display by for example, pressing an icon on a touch screen display, activating an icon on a non-touch screen display using a pointing device, etc. (block 420). Activation of this input mechanism causes a message to be sent (directly or indirectly) to a system controller (block 430). The technician may then perform the second step of the patching change specified in the work order (block 440). Upon completion of this second step, the technician again activates an input mechanism on the display (block 450). Activation of this input mechanism causes a message to be sent directly or indirectly to the system controller (block 460). The messages that are sent to the system controller may be messages indicating that the respective first and second steps have been completed. The system controller may update the connectivity database to reflect the completion of the patching change.

While the method of executing a patching connection change that is described above with respect to FIG. 11 sends messages to the system controller after the completion of each individual step of a patching change, it will be appreciated that in other embodiments the technician may only need activate the input mechanism once after the patching change is completed, at which time a single message is sent to the system controller. In still other embodiments, the electronic work order may include multiple patching changes, and the technician may only activate the input mechanism after all of the patching changes are completed, at which time a single message is sent to the system controller to notify the system controller that all of the patching changes listed in the work order were completed.

The above-described embodiments of the present invention that use a display and electronic work orders to update a connectivity database to reflect patching changes may provide a relatively inexpensive and convenient mechanism for mostly automating tracking of patching connection changes. While such a system may still be susceptible to technician errors (e.g., where a technician inserts a patch cord into, or removes a patch cord from, the incorrect connector port), it provides a simple and intuitive means for a technician to update the connectivity database, and may avoid typographical input errors that might otherwise occur (since the technician need only press a button upon completing a step or a patching change).

Embodiments of the present invention that have a technician send notification messages that update the connectivity database via a display that is located in a patching field may be particularly appropriate for use in interconnect-style patching fields where patch cords are used to directly connect connectors ports on the patch panels to corresponding connector ports on network devices such as network switches. Typically, it is more difficult or expensive to automatically track patching connection changes in interconnect-style patching systems, as network equipment is generally not available that has preinstalled capabilities for sensing patch cord plug insertions and removals and/or for determining patch cord connectivity information and transmitting that information to a connectivity database. By allowing a technician to simply and conveniently update the connectivity database by, for example, pressing a button on a touch screen display it is possible to avoid the additional expense and complexity of a fully automated patch cord connectivity tracking solution.

As noted above, in some embodiments of the present invention, the display 340 may be incorporated into or work in conjunction with a mobile system controller. The mobile system controller is a controller that may be carried or worn by a technician that displays information to a technician to assist in performing patching changes and/or which collects information that is used to automatically track patching connection changes. The use of mobile system controllers may provide a number of advantages such as, for example, the ability to use the controller with multiple equipment racks, the use of less rack space, simpler set-up of the patching system, etc. Moreover, the use of mobile system controllers may facilitate tracking patching connection changes to network switches, and other network devices without requiring any specialized tracking devices, equipment or patch cords. In some example embodiments, the mobile system controllers may be implemented, for example, on smartphones, tablet computers, intelligent eyeglasses such as Google Glass eyeglasses or on wearable gestural interfaces such as, for example, 3-dimensional sensor technology that is available from PrimeSense. In other embodiments, fixed system controllers may be used that are positioned at the patching field, but which are not necessarily mounted on or part of an equipment rack. For example, a computer and one or more cameras could be located above a patching field and positioned so that one of the cameras may view actions that are taking place at the equipment racks. The use of such mobile or fixed system controllers may allow further "intelligence" to be added to connector ports on "non-intelligent" devices such as conventional patch panels, network switches and the like.

One example embodiment of a mobile system controller and the use thereof will now be described with reference to FIGS. 12A-12D. In this example embodiment, the mobile system controller is implemented using a pair of Google Glass® eyeglasses that may be worn by a technician. It will be appreciated that the Google Glass® eyeglasses are simply one example of a mobile system controller, and that other technologies may alternatively be used.

Figure 12A:
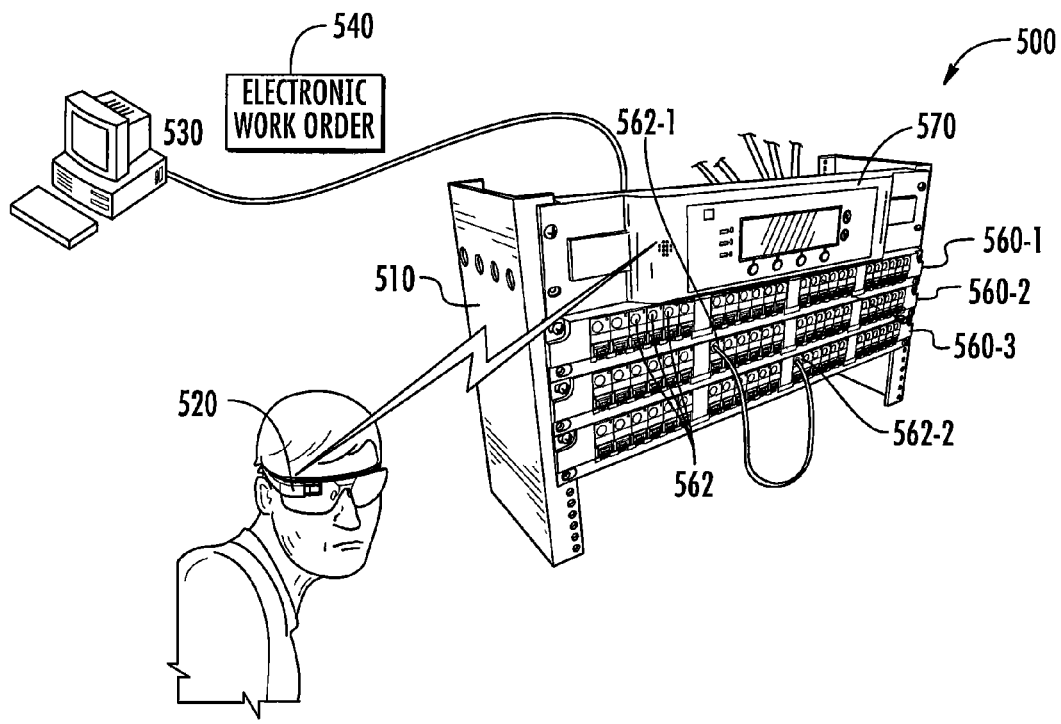
FIG. 12A is a schematic diagram illustrating a technician making a patching change in a patching filed using a mobile system controller according to embodiments of the present invention.

As shown in FIG. 12A, a patching change may be necessary in a patching field 500 that includes a plurality of equipment racks 510 (only one equipment rack 510 is illustrated in FIG. 12A in order to simplify the drawing) that contain patch panels, network switches and/or various other network equipment. In the depicted embodiment, three patch panels 560-1, 560-2, 560-3 are mounted on the equipment rack 510, as is a conventional rack controller 570. Each patch panel 560 includes a plurality of connector ports 562. The rack controller 570 may be in communication with a system administrator computer 530 that may be located elsewhere. The rack controller 570 may have wireless communications capabilities such as Bluetooth or NFC communications capabilities. A technician is in control of a mobile system controller 520 (i.e., the intelligent eyeglasses 520). The mobile system controller 520 may be in communications with the system administrator computer 530 via, for example, a Bluetooth communication link between the mobile system controller 520 and the rack controller 570 and a wired communications link between the rack controller 570 and the system administrator computer 530.

Figure 12B:
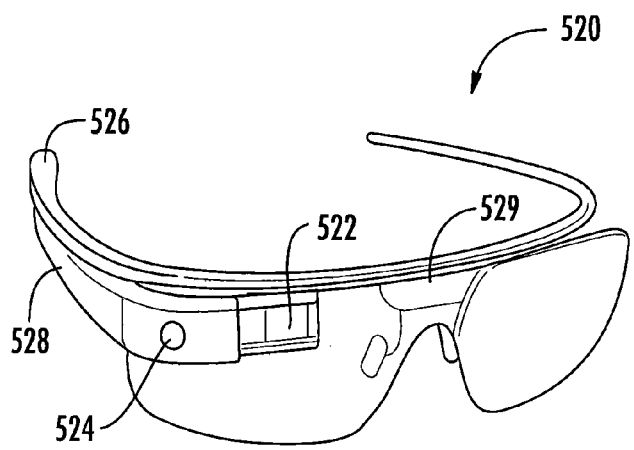
FIG. 12B is a perspective view of a mobile system controller according to embodiments of the present invention that is implemented in a pair of eyeglasses.

FIG. 12B is a perspective view of the intelligent eyeglasses 520 that comprise the mobile system controller. As shown in FIG. 12B, the intelligent eyeglasses 520 include a display 522 that the technician can view through one of the lenses of the intelligent eyeglasses 520. The eyeglasses 520 may also include a camera 524, a processor 526, a wireless communications module 528 and input/output devices 529 such as, for example, a microphone and a speaker.

Referring again to FIG. 12A, the system administrator computer 530 may initiate a patching change by transmitting an electronic work order 540 to the intelligent eyeglasses 520. In the depicted embodiment, the system administrator computer 530 transmits the electronic work order 540 to the rack controller 570 over a wired connection, and the rack controller 570 wirelessly transmits the electronic work order 540 to the intelligent eyeglasses 520 over, for example, a Bluetooth or NFC wireless connection. In other embodiments, the system administrator computer 530 may transmit the electronic work order 540 directly to the intelligent eyeglasses 520 over, for example, a wireless network (e.g., WiFi) or the cellular network. In this example, the electronic work order 540 instructs the technician to remove a first end of a patch cord 550 from a connector port 562-1 on the second patch panel 560-2 and to then plug the first end of patch cord 550 into a connector port 562-2 on a third patch panel 560-3.

Figure 12C:
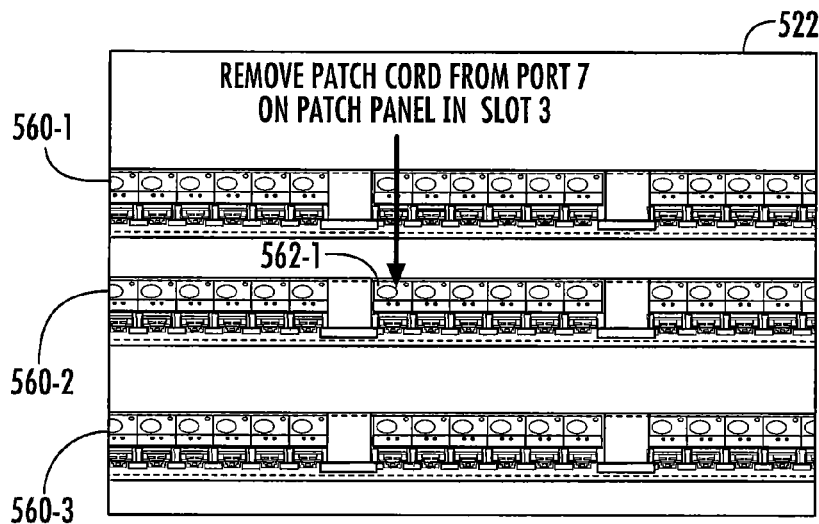
FIG. 12C is a schematic view of a display on the mobile system controller of FIG. 12B showing how a first step in a patching change may be displayed to a technician.

As shown in FIG. 12C, the display 322 on the intelligent eyeglasses 520 may display a picture of the second patch panel 560-2, and may highlight the connector port 562-1 that the first end of patch cord 550 is to be removed from. As is also shown in FIG. 12C, the display 522 may also include explicit step-by-step instructions to the technician of the actions that will be necessary to implement the patching change specified in the electronic work order 540. As the display 522 provides a visual indicator to the technician of the connector port 562-1 that the patch cord 550 should be removed from, it may not be necessary to provide conventional visual indicators such as LEDs at each connector port on the second patch panel 560-2 that are conventionally used to guide technicians to the correct connector port.

Figure 12D:
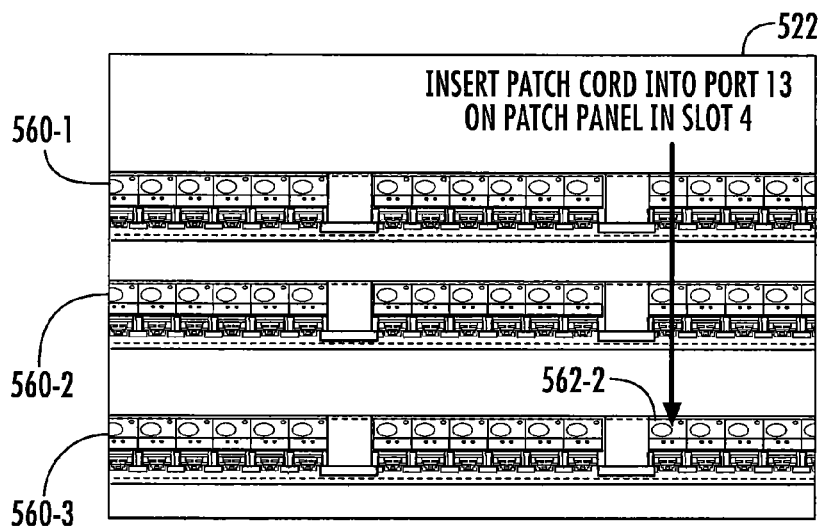
FIG. 12D is a schematic view of the display on the mobile system controller of FIG. 12B showing how the second step in the patching change may be displayed to the technician.

Once the technician has removed the first end of patch cord 550 from connector port 562-2, the technician may, for example, use a voice command such as "STEP COMPLETED" to notify the intelligent eyeglasses 520 that the first end of patch cord 550 has been removed from connector port 562-1. As shown in FIG. 12D, the intelligent eyeglasses 520 may then update the display 522 to show the next step in the patching change, which in this case is plugging the first end of patch cord 550 into connector port 562-2 on patch panel 560-3. A picture or schematic image of patch panel 560-2 may be pictured on the display 522, and connector port 562-2 may be highlighted in some fashion. Once the technician has plugged the first end of patch cord 550 into the connector port 562-2, the technician may, for example, use a voice command such as "STEP COMPLETED" to notify the intelligent eyeglasses 520 that the first end of patch cord 550 has been plugged into connector port 562-2. The intelligent eyeglasses 520 may then transmit a message to the system administrator computer 530 that the first end of patch cord 550 has been inserted into connector port 562-2 on patch panel 560-2.

Figure 12E:
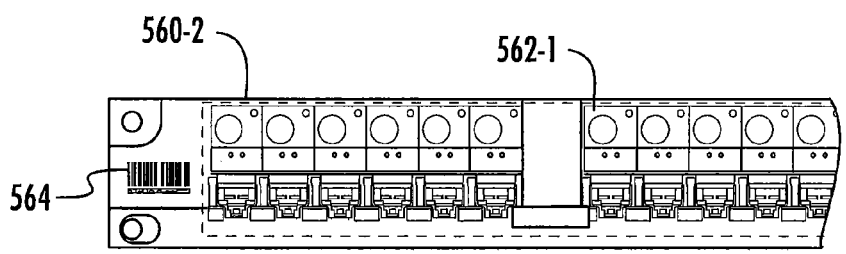
FIG. 12E is a schematic close-up view of one of the patch panels in FIG. 12A that illustrates a readable label that is provided on the patch panel to facilitate detecting patch cord insertions and removals from connector ports on the patch panel.

In still further embodiments, the mobile system controller 520 may fully automate tracking the connectivity changes associated with each patching change. For example, in further embodiments, the intelligent eyeglasses 520 in the example above may be configured to "sense" the insertion and removal of patch cords from the patch panels 560 and other network equipment that is mounted on the equipment racks 510, and to then transmit information regarding the detected patch cord insertion or removal to another controller such as the system administrator computer 530 that runs the network management software For example, as shown in FIG. 12E, which is a schematic close-up view of the patch panel 560-2, a readable label such as a bar code 564 may be provided on each patch panel and other items of equipment mounted on the equipment racks 510. The intelligent eyeglasses 520 may include barcode scanning software. The intelligent eyeglasses 520 may be programmed to use the camera 524 to automatically identify and read the barcodes (such as barcode 564) on the patch panels and other equipment. The barcode 564 may have data embedded therein such as equipment identification information (e.g., a patch panel identification number) and information on the type of equipment (e.g., a Systimax GS6 version 3.1 24-port patch panel). Once the intelligent eyeglasses 520 locate the patch panel 560-2, they may query a database to determine the location of connector port 562 on patch panel 560-2. Images taken using the camera 524 may then be compared, for example, to stored images to determine whether the first end 552 of patch cord 550 has been removed from connector port 562-1. Once the intelligent eyeglasses 520 sense that the patch cord 550 has been removed from connector port 562-1 (by, for example, obtaining an image on camera 524 of connector port 562-1 that matches a stored image of connector port 562-1 with no patch cord inserted therein), then the intelligent eyeglasses 520 may transmit an instruction to a central controller such as the system administrator computer 530 indicating that the first end 552 of patch cord 550 has been removed from connector port 562-1.

In still other embodiments, bar codes or other optical identifiers may be provided on each patch cord (e.g., on the strain relief boot of each plug) and each connector port. In such embodiments, the system may simply scan a piece of equipment (e.g., a patch panel or a network switch) or an entire equipment rack and automatically determine which patch cords are connected where. So long as the patch cords are arranged so that the scanner is able to scan each identifier, these embodiments may provide a very simple way to track all of the patching cord connections in a patching field.

In some embodiments, the camera 524 and barcode scanning software on the intelligent eyeglasses 520 may also be used to identify any errors that the technician may make in implementing a patching change. In particular, when a technician is inserting or removing a patch cord from a connector port, they will typically look directly at the connector port that is involved in the patching change. The camera 524 may have a relatively wide field of view, as this may facilitate capturing images of barcodes 564 that may be mounted on a piece of equipment (e.g., a patch panel or a network switch) at some distance from at least some of the connector ports on the piece of the equipment. However, the central portion of each image captured by the camera 524 will typically focus on the connector port that is involved in the patching change (and perhaps a small number of other connector ports). The intelligent eyeglasses 520 may be programmed to process the central portions of the images captured by the camera 524 to determine the identity of the connector ports in the central portion of the field of view and the status of those connector ports (e.g., they do or do not have a patch cord inserted therein). This information may be forwarded to the system administration computer 530 and compared to stored information regarding which of these connector ports should have patch cords therein. If a determination is made that a patch cord has been plugged into a connector port that is not supposed to have a patch cord therein (or that a patch cord has been removed from a connector port that should still have a patch cord plugged into it), an error message may be generated and transmitted to the technician, where it may be provided to the technician via an output device such as a speaker on the intelligent eyeglasses 520 or as an error message on the display 522. In this fashion, not only can the intelligent eyeglasses 520 be used to (1) lead the technician through the steps of the patching change and (2) automatically update the connectivity database in real time as the steps of the patching change are carried out, but they may also be used to (3) identify any errors made by the technician, such as removing the wrong patch cord from the wrong connector port or plugging a patch cord into the wrong connector port, and to then identify these errors to the technician in real time in the patching field 500. This may result in significant time savings since technicians may immediately correct their mistakes as opposed to having to retrace their steps later to do so.

Thus, in the example above, once the technician has removed the first end 552 of patch cord 550 from connector port 562-1, the intelligent eyeglasses 520 may sense that the patch cord 550 has been removed by comparing an image of connector port 562-1 that is captured by the camera 524 to a stored image (or other information) that is sufficient for the processor 526 in the intelligent eyeglasses 520 to determine that the image indicates that the connector port 562-1 no longer has a patch cord inserted therein. The intelligent eyeglasses 520 may then transmit a message to the system administrator computer 530 that the first end 552 of patch cord 550 has been removed from connector port 562.

It will be readily apparent from the above examples that the mobile system controllers according to embodiments of the present invention may be used to automatically track patching connections to not only patch panels, but also to any other type of equipment that receives patch cords including network switches, servers, routers, SANS, etc. Typically, these other types of equipment cannot be purchased with intelligent patching capabilities, and thus embodiments of the present invention may make it much easier to automatically track patching connections to these other types of equipment.

In the embodiments described above with respect to FIGS. 12A-12E, the mobile system controller 520 in the form of a pair of intelligent eyeglasses automatically pairs with the rack controller 570 on each equipment rack when the technician stands in front of the equipment rack via, for example, a wireless communications link. Each rack controller 570 is in wired communication with a system administration computer 530 that runs the network management software and updates the connectivity database. It will be appreciated, however, that numerous modifications may be made to this arrangement pursuant to the teachings of the present invention.

For example, in further embodiments, different communications means may be used, such as wireless communications between each rack controller 570 and the system administrator computer 530 (e.g., over a WiFi network) or wired communications between the mobile system controller 520 and the rack controller 570 (e.g., by connecting a tablet computer based mobile system controller 520 to the rack controller 570 via a wired connection). As another example, in still other embodiments each row or aisle of equipment racks (e.g., in a data center) may have a single "row controller" that provides intelligent patching functionality for the entire row or aisle of equipment racks. The mobile system controller 520 (e.g., the above-described intelligent eyeglasses 520) automatically pairs with the row controller when the technician stands in front of the row (or in the aisle in the case of an "aisle controller") via, for example, a wireless communications link. Each row/aisle controller is in wired communication with the system administration computer 530 that runs the network management software and updates the connectivity database. Each equipment rack may have a bar code or some other identification that may be processed optically or electrically by the intelligent eyeglasses 520 so that the intelligent eyeglasses 520 will be able to distinguish between different equipment racks and associate the equipment racks with information stored in a database regarding the equipment that is mounted on the rack. In these embodiments, as with the embodiments described above where the intelligent eyeglasses 520 communicate with a rack controller 570, the intelligent eyeglasses 520 may be used as both a display that guides the technician through patching connection changes and as an input device that collects and tracks information regarding patching connection changes and forwards this information to the system administrator computer 530 for use in updating the connectivity database.

In still further embodiments, the rack/row/aisle controllers may be omitted, and the intelligent eyeglasses 520 may communicate wirelessly with the system administrator computer 530 via, for example, a WiFi or broadband wireless network. In these embodiments, each equipment rack may again include a bar code or other identifier that may be processed optically or electrically by the intelligent eyeglasses 520 so that the intelligent eyeglasses 520 will be able to distinguish between different equipment racks and associate the equipment racks with information stored in a database regarding the equipment that is mounted on each rack.

It will likewise be appreciated that the intelligent patching control functions may be carried out in any appropriate location, and may all be carried out in a single location or the functions may be distributed and carried out at multiple locations. For example, in some of the above-described embodiments, processing capabilities are provided at the mobile system controller 520 (e.g., the intelligent eyeglasses 520), at the rack/row/aisle controllers 570, and at the system administrator computer 530. Any of these "controllers" may, for example, run the system management software, update the connectivity database, store information regarding the equipment mounted on the equipment racks, generate the electronic work orders or perform any other operations used to assist technicians in making patching connection changes or in automatically tracking such patching changes. Thus, while the descriptions above provide examples as to how various functions may be distributed across these controllers, it will be appreciated that numerous other distributions are possible, and that more or fewer controllers may be provided.

While the eyeglasses 520 represent one type of system controller, it will be appreciated that other types of system controllers may be used, including fixed system controllers. For example, cameras may be mounted on equipment racks, in overhead locations, etc. that are used in place of the camera 524 on the intelligent eyeglasses 520. These cameras may have associated processors that perform the image processing that is described above that is used to detect patch cord insertions and removals and that is used to identify the connector ports where these patch cord insertions and removals occurred. Thus, it will be appreciated that any appropriate system controller may be used. The concept is that the intelligence is moved from the patch panels to one or more other mobile or fixed devices (i.e., the mobile or fixed system controllers described above) that are used to detect patch cord insertions and removals and to update the connectivity database using this information. Additionally, by using an electronic work order system in conjunction with the mobile or fixed system controllers that are present in the patching fields, the system may detect errors made by technicians during patching changes and notify the technicians of these errors almost immediately.

In still further embodiments, the mobile system controller may be implemented to include both a display and 3-dimensional scanning technology such as, for example, the 3-dimensional scanning technology available from PrimeSense, which may be implemented, for example, in a single device such as a pair of intelligent eyeglasses. In example embodiments, identifiers such as bar codes may be provided on the patch cords and pieces of equipment. The 3-dimensional scanning technology may be used to scan the equipment on each equipment rack and to recognize which patch cords (which can be identified by their bar codes) are plugged into which connector ports (which can be identified by the bar codes on each piece of equipment and stored information regarding the connector port layout on each piece of equipment, or barcodes at each connector port). Thus, in these embodiments, the mobile system controller may be used to automatically scan the equipment racks and populate the connectivity database. When patching connection changes are made, the mobile system controller can identify such changes from the 3-dimensional scans and update the connectivity database to reflect the patching connection changes. Thus, in some embodiments, highly automated intelligent patch cord tracking may be provided without the need for special patch panels, network switches, patch cords or the like.

Pursuant to still further embodiments of the present invention, the display that is provided in the patching field (e.g., display 340 of FIGS. 9-10 or display 522 of FIGS. 12A-D) may be used to provide a technician information which may be used to diagnose identified problems or error situations. For example, in some embodiments, a technician may send a request to, for example, the system administrator computer that an "audit trail" be displayed on the display 340/522 for a particular connector port. This audit trail may show, for example, a history of the connections to the connector port including for example, identification of the end devices and intermediate points of those connections. This connection history information may be helpful to the technician in identifying the cause of an unanticipated problem in the network.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A system for automatically tracking patching connection changes, the system comprising:
    a piece of equipment that includes a plurality of connector ports;
    a system controller;
    a camera that is in communication with the system controller, the camera being separate from the piece of equipment; and
    a connectivity database,
    wherein the system controller is configured to use the camera to automatically identify (a) an identifier associated with the piece of equipment, (b) insertion or removal of a patch cord at one of the plurality of connector ports, and (c) the one of the plurality of connector ports at which the patch cord was inserted or removed, and to then transmit a message relating to the identified patch cord insertion or removal, and
    wherein the connectivity database is updated to reflect the insertion or removal of the patch cord from the identified one of the plurality of connector ports on the identified piece of equipment in response to the message.

2. The system of claim 1, wherein the piece of equipment includes a bar code that includes the identifier associated with the piece of equipment, and wherein the system controller is configured to use the camera to read the identifier associated with the piece of equipment from the bar code.

3. The system of claim 1, wherein the system controller is configured to identify the insertion or removal of the patch cord at the one of the plurality of connector ports by comparing an image of the piece of equipment captured by the camera with stored information.

4. The system of claim 1, wherein the stored information comprises a stored image.

5. The system of claim 1, wherein the stored image comprises an image of the piece of equipment with no patch cord inserted into the one of the plurality of connector ports.

6. The system of claim 1, wherein the system controller is configured to identify the one of the plurality of connector ports at which the insertion or removal of the patch cord occurred by comparing an image of the piece of equipment captured by the camera with stored information regarding the piece of equipment.

7. The system of claim 1, wherein the stored information comprises information regarding the connector port layout on the piece of equipment.

8. The system of claim 1, wherein the system controller is configured to identify the one of the plurality of connector ports at which the insertion or removal of the patch cord occurred by reading a connector port identifier from a bar code on the piece of equipment that is associated with the one of the plurality of connector ports.

9. The system of claim 1, wherein the system controller comprises a mobile system controller that is worn by a technician.

10. The system of claim 9, wherein the mobile system controller comprises a pair of intelligent eyeglasses.

11. The system of claim 1, wherein the system controller comprises a fixed system controller that is mounted above a patching field that includes the piece of equipment.

12. The system of claim 1, wherein the piece of equipment is a network switch.

13. The system of claim 1, wherein the piece of equipment is a passive patch panel.

14. The system of claim 1, wherein the system controller further includes an electronic display, and is configured to display step-by-step instructions of the actions required to implement a patching connection change on the electronic display.

15. The system of claim 1, wherein the system controller is configured to determine an identifier of the patch cord using the camera.

16. The system of claim 15, wherein the system controller is configured to determine the identifier of the patch cord using the camera by reading the identifier of the patch cord from a bar code mounted on the patch cord.

17. The system of claim 1, wherein the camera is part of a pair of intelligent eyeglasses.

18. The system of claim 1, wherein the camera is carried by a technician.

19. The system of claim 10, wherein the piece of equipment is a network switch.

* * * * *

UNITED STATES PATENT AND TRADEMARK OFFICE
CERTIFICATE OF CORRECTION

PATENT NO. : 9,338,525 B2
APPLICATION NO. : 14/811946
DATED : May 10, 2016
INVENTOR(S) : Pinn et al.

Page 1 of 1

It is certified that error appears in the above-identified patent and that said Letters Patent is hereby corrected as shown below:

In the specification,

Column 10, Line 9: Please correct "panels 112'."
to read -- panels 112'''. --

Line 41: Please correct "the display 160' may"
to read -- the display 116''' may --

Line 55: Please correct "160'. In particular"
to read -- 160'''. In particular --

Signed and Sealed this
Second Day of August, 2016

Michelle K. Lee
*Director of the United States Patent and Trademark Office*